(12) United States Patent
Sugaya

(10) Patent No.: US 6,894,800 B2
(45) Date of Patent: May 17, 2005

(54) INFORMATION PROCESSING APPARATUS AND INFORMATION DISPLAY METHOD FOR DISPLAYING JOB INFORMATION RELATING TO AN OUTPUT JOB

(75) Inventor: Akio Sugaya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 815 days.

(21) Appl. No.: 09/784,110

(22) Filed: Feb. 16, 2001

(65) Prior Publication Data

US 2001/0015812 A1 Aug. 23, 2001

(30) Foreign Application Priority Data

Feb. 23, 2000 (JP) ........................................ 2000-045702
Feb. 2, 2001 (JP) ........................................ 2001-027056

(51) Int. Cl.⁷ .............................................. G06K 15/00
(52) U.S. Cl. ...................... 358/1.15; 358/1.14; 358/1.1; 358/1.9
(58) Field of Search ................................ 718/100, 101, 718/102, 103, 104, 105, 106; 358/1.13, 1.15, 1.16, 401, 444, 468, 1.9; 347/246

(56) References Cited

U.S. PATENT DOCUMENTS

| | | | |
|---|---|---|---|
| 4,947,345 A | 8/1990 | Paradise et al. ............. 364/519 |
| 5,095,369 A | 3/1992 | Ortiz et al. .................. 358/296 |
| 5,175,679 A | 12/1992 | Allen et al. .................. 354/148 |
| 5,493,408 A | 2/1996 | Kurogane et al. .......... 358/296 |
| 5,867,636 A | * 2/1999 | Walker ........................ 358/1.15 |
| 6,181,436 B1 | * 1/2001 | Kurachi ....................... 358/1.15 |
| 6,219,148 B1 | * 4/2001 | Takashima ................. 358/1.15 |
| 6,353,484 B1 | * 3/2002 | Takashima ................. 358/1.15 |
| 6,466,327 B1 | 10/2002 | Inabe et al. ................. 358/1.13 |
| 6,474,881 B1 | * 11/2002 | Wanda ......................... 400/61 |
| 6,570,605 B1 | * 5/2003 | Kashiwazaki ............... 347/264 |
| 6,587,126 B1 | 7/2003 | Wakai et al. ................ 345/744 |
| 6,667,810 B1 | 12/2003 | Jeyachandran et al. .... 358/1.14 |
| 2001/0013954 A1 | 8/2001 | Nagal et al. ................. 358/444 |
| 2003/0061322 A1 | 3/2003 | Igarashi et al. ............. 709/223 |

* cited by examiner

Primary Examiner—Majid Banankhah
(74) Attorney, Agent, or Firm—Fitzpatrick, Cella, Harper & Scinto

(57) ABSTRACT

According to the present invention, printing-job information relating to printing jobs present within a print server and printing-job information relating to printing jobs present within a printer can be displayed at a time, and the user can precisely know all printing jobs to be processed by the printer. Even if the user does not know whether a printing job is present within the print server or within the printer, a change in a schedule of a printing job assigned by the user can be appropriately performed in the print server or the printer.

30 Claims, 22 Drawing Sheets

FIG.6A

| JOB TITLE | USER NAME | NAME OF OUTPUT HOST APPARATUS | PRINT-SERVER NAME | PROCESS STATUS |
|---|---|---|---|---|
| JOB B | USER B | HOST APPARATUS B | SERVER A | IN TRANSFER |
| JOB C | USER A | HOST APPARATUS A | SERVER A | AWAITING TRANSFER |

FIG.6B

| JOB TITLE | USER NAME | NAME OF OUTPUT HOST APPARATUS | PRINT-SERVER NAME | PROCESS STATUS |
|---|---|---|---|---|
| JOB A | USER A | HOST APPARATUS A | SERVER A | IN OUTPUT |
| JOB Y | USER Y | HOST APPARATUS Y | SERVER A | AWAITING OUTPUT |
| JOB B | USER B | HOST APPARATUS B | SERVER A | IN RECEPTION |

FIG.6C

| JOB NUMBER | JOB TITLE | USER NAME | NAME OF OUTPUT HOST APPARATUS | PRINT-SERVER NAME | PROCESS STATUS |
|---|---|---|---|---|---|
| 1 | JOB A | USER A | HOST APPARATUS A | SERVER A | IN OUTPUT |
| 2 | JOB Y | USER Y | HOST APPARATUS Y | SERVER A | AWAITING OUTPUT |
| 3 | JOB B | USER B | HOST APPARATUS B | SERVER A | IN TRANSFER |
| 4 | JOB C | USER A | HOST APPARATUS A | SERVER A | AWAITING TRANSFER |

FIG.11A

| JOB TITLE | USER NAME | NAME OF OUTPUT HOST APPARATUS | PRINT-SERVER NAME | PROCESS STATUS | CONTROL LEVEL |
|---|---|---|---|---|---|
| JOB B | USER B | HOST APPARATUS B | SERVER A | IN TRANSFER | LEVEL 2 |
| JOB C | USER A | HOST APPARATUS A | SERVER A | AWAITING TRANSFER | LEVEL 2 |

FIG.11B

| JOB TITLE | USER NAME | NAME OF OUTPUT HOST APPARATUS | PRINT-SERVER NAME | PROCESS STATUS | CONTROL LEVEL |
|---|---|---|---|---|---|
| JOB X | USER X | HOST APPARATUS X | LOCAL I/F | IN OUTPUT | INCAPABILITY OF CHANGE |
| JOB A | USER A | HOST APPARATUS A | SERVER A | AWAITING OUTPUT | LEVEL 2 |
| JOB Y | USER Y | HOST APPARATUS Y | SERVER B | AWAITING OUTPUT | LEVEL 1 |
| JOB B | USER B | HOST APPARATUS B | SERVER A | IN RECEPTION | LEVEL 2 |

FIG.11C

| JOB NUMBER | JOB TITLE | USER NAME | NAME OF OUTPUT HOST APPARATUS | PRINT-SERVER NAME | PROCESS STATUS | CONTROL LEVEL |
|---|---|---|---|---|---|---|
| 1 | JOB X | USER X | HOST APPARATUS X | LOCAL I/F | IN OUTPUT | INCAPABILITY OF CHANGE |
| 2 | JOB A | USER A | HOST APPARATUS A | SERVER A | AWAITING OUTPUT | LEVEL 2 |
| 3 | JOB Y | USER Y | HOST APPARATUS Y | SERVER B | AWAITING OUTPUT | LEVEL 1 |
| 4 | JOB B | USER B | HOST APPARATUS B | SERVER A | IN TRANSFER | LEVEL 2 |
| 5 | JOB C | USER A | HOST APPARATUS A | SERVER A | AWAITING TRANSFER | LEVEL 2 |

FIG.12A

| JOB TITLE | USER NAME | NAME OF OUTPUT HOST APPARATUS | PRINT-SERVER NAME | PROCESS STATUS | CONTROL LEVEL |
|---|---|---|---|---|---|
| JOB Z | USER Z | HOST APPARATUS Z | SERVER B | AWAITING TRANSFER | LEVEL 2 |

FIG.12B

| JOB TITLE | USER NAME | NAME OF OUTPUT HOST APPARATUS | PRINT-SERVER NAME | PROCESS STATUS | CONTROL LEVEL |
|---|---|---|---|---|---|
| JOB X | USER X | HOST APPARATUS X | LOCAL I/F | IN OUTPUT | INCAPABILITY OF CHANGE |
| JOB A | USER A | HOST APPARATUS A | SERVER A | AWAITING OUTPUT | LEVEL 1 |
| JOB Y | USER Y | HOST APPARATUS Y | SERVER B | AWAITING OUTPUT | LEVEL 2 |
| JOB B | USER B | HOST APPARATUS B | SERVER A | IN RECEPTION | LEVEL 1 |

FIG.12C

| JOB NUMBER | JOB TITLE | USER NAME | NAME OF OUTPUT HOST APPARATUS | PRINT-SERVER NAME | PROCESS STATUS | CONTROL LEVEL |
|---|---|---|---|---|---|---|
| 1 | JOB X | USER X | HOST APPARATUS X | LOCAL I/F | IN OUTPUT | INCAPABILITY OF CHANGE |
| 2 | JOB A | USER A | HOST APPARATUS A | SERVER A | AWAITING OUTPUT | LEVEL 1 |
| 3 | JOB Y | USER Y | HOST APPARATUS Y | SERVER B | AWAITING OUTPUT | LEVEL 2 |
| 4 | JOB B | USER B | HOST APPARATUS B | SERVER A | IN TRANSFER | LEVEL 1 |
| 5 | JOB Z | USER Z | HOST APPARATUS Z | SERVER B | AWAITING TRANSFER | LEVEL 2 |

FIG.20A

| JOB TITLE | USER NAME | NAME OF OUTPUT HOST APPARATUS | PRINT-SERVER NAME | PROCESS STATUS |
|---|---|---|---|---|
| JOB B | USER B | HOST APPARATUS B | SERVER A | IN TRANSFER |
| JOB C | USER A | HOST APPARATUS A | SERVER A | AWAITING TRANSFER |

FIG.20B

| JOB TITLE | USER NAME | NAME OF OUTPUT HOST APPARATUS | PRINT-SERVER NAME | PROCESS STATUS |
|---|---|---|---|---|
| JOB A | USER A | HOST APPARATUS A | SERVER A | IN OUTPUT |
| JOB Y | USER Y | HOST APPARATUS Y | SERVER A | AWAITING OUTPUT |
| JOB B | USER B | HOST APPARATUS B | SERVER A | IN RECEPTION |

FIG.20C

| JOB NUMBER | JOB TITLE | USER NAME | NAME OF OUTPUT HOST APPARATUS | PRINT-SERVER NAME | PROCESS STATUS |
|---|---|---|---|---|---|
| 1 | JOB A | USER A | HOST APPARATUS A | SERVER A | IN OUTPUT |
| 2 | JOB Y | USER Y | HOST APPARATUS Y | SERVER A | AWAITING OUTPUT |
| 3 | JOB B | USER B | HOST APPARATUS B | SERVER A | IN TRANSFER |
| 4 | JOB C | USER A | HOST APPARATUS A | SERVER A | AWAITING TRANSFER |

FIG.23
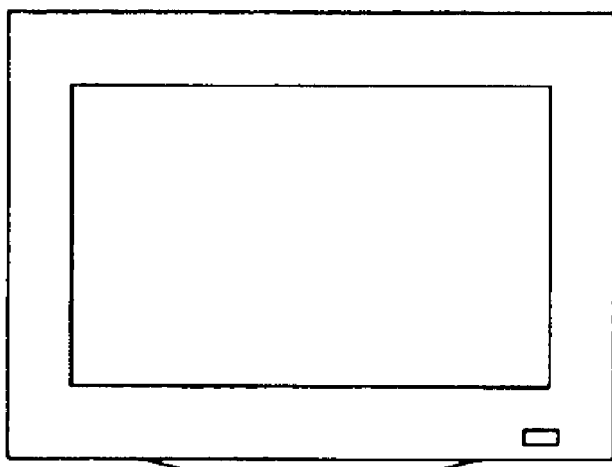
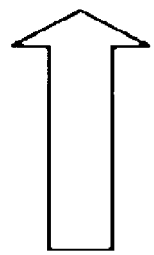
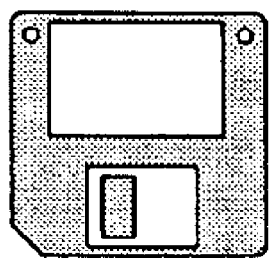

INFORMATION PROCESSING APPARATUS AND INFORMATION DISPLAY METHOD FOR DISPLAYING JOB INFORMATION RELATING TO AN OUTPUT JOB

BACKGROUND OF THE INVENTION

1. Field of the Invention

The present invention relates to an image output system in which, for example, a computer, a print server and a printer are interconnected via a network.

2. Description of the Related Art

Recently, computers are interconnected via a LAN (local area network), and various peripheral apparatuses, such as a multifunctional image processing apparatus having copying and facsimile functions, and the like, can also be subjected to LAN connection.

A LAN through which computers within a location (for example, a floor of a building) are interconnected allows sharing of apparatuses by a user group and data transfer between the apparatuses. In some cases, by interconnecting a plurality of LANs present at geographically separated locations via a high-speed integrated digital network (such as an ISDN (Integrated Services Digital Network) or the like) or a public telephone network, a WAN (wide area network), such as the Internet WWW (World Wide Web), is provided.

Usually, such a LAN/WAN is constituted by computers including file servers and print servers. A network operating system mounted in each of the computers deals with various protocols, for example, for transferring data and files, sharing data and files, and sharing a printer.

A printing job transferred from application software operating in each computer is generally transferred to a printer connected to the network via a print server.

A communication protocol for performing remote control and acquiring information of various apparatuses constituting the network, such as computers and printers connected to the network, is standardized. The SNMP (Simple Network Management Protocol) is known as a typical example of such protocols.

When network apparatuses mount such a protocol, network management software can manage these apparatuses and acquire information from a remote location connected to the network. For example, in the case of a printer, it is possible, for example, to acquire information relating to the printer, monitor the state of the printer, notify that the state of the printer has changed, and control initialization of the printer.

Various sets of document formation software, table calculation software and the like are known as sets of user application software operating in each computer constituting a LAN. Data formed using such application software is converted into data of a PDL (Printer Description Language), serving as a printer control language, by printer driving software. The obtained PDL data is temporarily stored in a print spooler, and then transmitted to a printer as a printing job. A print spooler and a single printer are not always in one-to-one correspondence. In some cases, printing jobs stored in corresponding ones of a plurality of print spoolers are transmitted to a printer.

A printing job is generated by converting data generated from one or a plurality of application document files into PDL data corresponding to each printer by printer driver software, and is a unit constituting one printing document.

Usually, a printing job is framed by a job starting instruction and a job ending instruction. The type of the PDL data and version information are added to the job starting instruction or the like. Such information is utilized for determining the type or the version of the PDL data by a printing-job processing module when a printing job is processed in the printer.

In a LAN, computers, printers and the like are usually interconnected by Ethernet cables. Recently, however, network interconnection of digital apparatuses according to the IEEE 1394-1995 (High Performance Serial Bus) method having a higher speed has also been realized.

Apparatuses, each having an IEEE 1394 serial bus interface (I/F), have respective peculiar IDs and constitute a network by mutually recognizing these IDs. Each of the apparatuses connected to the network can independently transmit data to another apparatus without intervention of a computer, and can sometimes receive data.

In the above-described conventional approach, a host computer can display a state of processing of a printing job within the computer's print spooler, such as in storage in a spool, in holding, in transfer, or the like, on a CRT (cathode-ray tube). However, it is impossible to acquire printing-job information relating to a printing job already transferred from the print spooler to an image output apparatus, and to display a state of processing of the job on the CRT.

In the conventional approach, a host computer can perform control of a schedule of a printing job within the computer's print spooler, such as temporary interruption of transfer of the printing job, cancel of the printing job, change of the order of transfer of the printing job, or the like, in accordance with an instruction from the user. However, it is impossible to directly control an output schedule of a printing job already transferred from the print spooler to an image output apparatus, or to provide the image output apparatus with an instruction of a schedule in order to change an output schedule.

In the conventional approach, since a host computer cannot acquire printing-job information relating to a printing job transferred from another print server or another input unit, it is impossible to control display of job information of a printing job transferred from another user within an image output apparatus, display of a state of processing of the printing job, and an output schedule of the printing job.

In the conventional approach, it is impossible to determine whether or not a printing job output from another user remains within an image output apparatus. Accordingly, when another user transfers a large amount of image data to another print spooler or from another input unit even if a printing job to be transferred is absent within a print spooler, it is necessary to await output of the data, resulting in an increase in the time for outputting a printing job.

SUMMARY OF THE INVENTION

The present invention has been made in consideration of the above-described problems.

It is an object of the present invention to provide an image output system, an information processing apparatus, an image output method and a storage medium in which it is possible to acquire information relating to a state of processing of a printing job already transferred from a print spooler to an image output apparatus, and integrally display and notify respective states of processing from execution of a printing operation by a user to actual output of the printing job form the image output apparatus.

It is another object of the present invention to provide an image output system, an information processing apparatus, an image output method and a storage medium in which it is possible to perform control or an instruction of control of a printing job already transferred from a print spooler to an image output apparatus, and in respective processing steps from execution of a printing operation by a user to actual output of the printing job from the image output apparatus, the user can integrally control and instruct a schedule of the job, including, for example, temporary interruption of processing of the printing job, an instruction of cancel of the printing job, a change of the order of processing, an interrupt operation, and the like.

It is still another object of the present invention to provide an image output system, an information processing apparatus, an image output method and a storage medium in which by displaying and notifying whether or not a printing job transferred from another print spooler or another input unit, more specifically, for example, a printing job of another user that has been input in advance, is present within an image output apparatus, a user can assuredly confirm the order of output of the user's own printing job.

It is yet another object of the present invention to provide an image output system, an information processing apparatus, an image output method and a storage medium in which, when a printing job input from a print spooler and a printing job transferred from another print spool or another input unit are mixed within an image output apparatus, it is possible to change an instruction of control capable of being instructed by a user, by determining an instruction-control execution level or a control permission level of output-schedule control of a printing job in accordance with attribute information relating to each printing job, more specifically, for example, information for each input unit or each user.

According to one aspect, the present invention which achieves these objectives relates to an information processing apparatus including first storage means for storing job information relating to output jobs within an output apparatus in a first storage area, second storage means for storing job information relating to output jobs within an output control apparatus for transferring an output job to the output apparatus in a second storage area, and display control means for displaying a list of the job information relating to the output jobs within the output apparatus and the job information relating to the output jobs within the output control apparatus on a display unit, based on the job information stored in the first storage area and the job information stored in the second storage area.

According to another aspect, the present invention which achieves these objectives relates to an information display method including a first storage step of storing job information relating to output jobs within an output apparatus in a first storage area, a second storage step of storing job information relating to output jobs within an output control apparatus for transferring an output job to the output apparatus in a second storage area, and a display control step of displaying a list of the job information relating to the output jobs within the output apparatus and the job information relating to the output jobs within the output control apparatus on a display unit, based on the job information stored in the first storage area and the job information stored in the second storage area.

According to still another aspect, the present invention which achieves these objectives relates to a recording medium, capable of being read by a computer, storing a program for causing the computer to execute steps including a first storage step of storing job information relating to output jobs within an output apparatus in a first storage area, a second storage step of storing job information relating to output jobs within an output control apparatus for transferring an output job to the output apparatus in a second storage area, and a display control step of displaying a list of the job information relating to the output jobs within the output apparatus and the job information relating to the output jobs within the output control apparatus on a display unit, based on the job information stored in the first storage area and the job information stored in the second storage area.

According to yet another aspect, the present invention which achieves these objectives relates to an information display program for causing a computer to execute steps including a first storage step of storing job information relating to output jobs within an output apparatus in a first storage area, a second storage step of storing job information relating to output jobs within an output control apparatus for transferring an output job to the output apparatus in a second storage area, and a display control step of displaying a list of the job information relating to the output jobs within the output apparatus and the job information relating to the output jobs within the output control apparatus on a display unit, based on the job information stored in the first storage area and the job information stored in the second storage area.

According to yet a further aspect, the present invention which achieves these objectives relates to a network system in which an output apparatus and an output control apparatus are interconnected via a network. The network system includes first storage means for storing job information relating to output jobs within an output apparatus in a first storage area, second storage means for storing job information relating to output jobs within an output control apparatus for transferring an output job to the output apparatus in a second storage area, display control means for displaying a list of the job information relating to the output jobs within the output apparatus and the job information relating to the output jobs within the output control apparatus on a display unit, based on the job information stored in the first storage area and the job information stored in the second storage area, instruction input means for accepting an instruction to change an output schedule of an output job selected on the display unit, command transmission means for determining whether the output job assigned by the instruction is within the output apparatus or within the output control apparatus, and transmitting a change command to the output apparatus or the output control apparatus based on a result of the determination, first change means for changing an output schedule of the output job within the output apparatus in accordance with the change command transmitted from the command transmission means, and second change means for changing an output schedule of the output job within the output control apparatus in accordance with the change command transmitted from the command transmission means.

The foregoing and other objects, advantages and features of the present invention will become more apparent from the following description of the preferred embodiments taken in conjunction with the accompanying drawings.

BRIEF DESCRIPTION OF THE DRAWINGS

FIGS. 6A, 6B and 6C are diagrams illustrating a generated-job-information storage region, a job-information-within-printer storage region, and a job-information synthesis/storage region, respectively;

FIGS. 11A–11C are diagrams illustrating information stored on a hard disk within a print server A;

FIGS. 12A–12C are diagrams illustrating information stored on a hard disk within a print server B;

FIGS. 20A, 20B and 20C are diagrams illustrating a job-information storage region, a job-information-within-printer storage region, and a job-information synthesis/storage region, respectively;

FIG. 23 is a diagram illustrating a method for supplying a program.

DESCRIPTION OF THE PREFERRED EMBODIMENTS

A description will now be provided of an image output system, an information processing apparatus, an image output method and a storage medium according to an embodiment of the present invention. In the image output system according to the embodiment, a laser-beam printer (LBP) is used.

Figure 14:
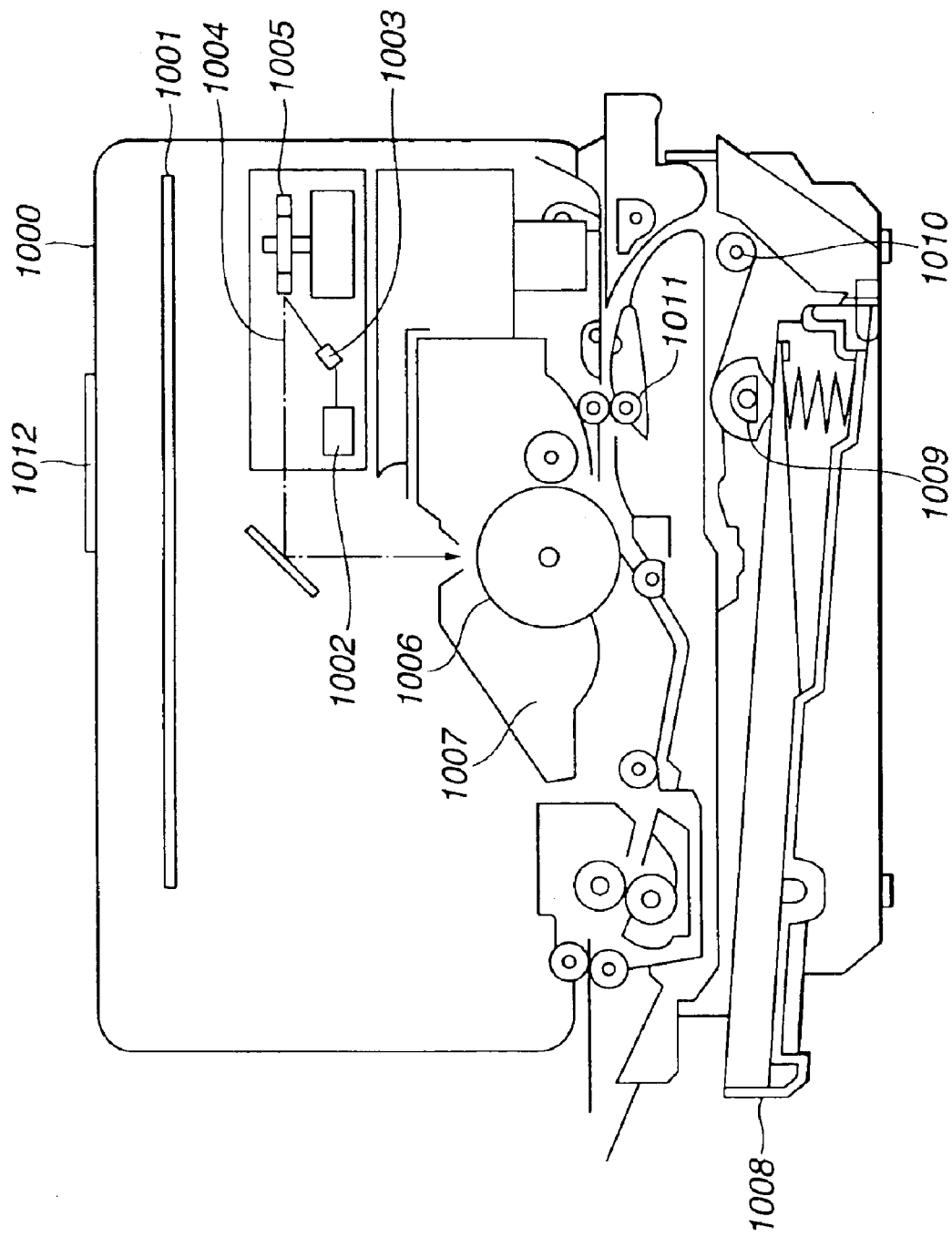
FIG. 14 is a schematic cross-sectional view illustrating the configuration of a laser-beam printer.

FIG. 14 is a schematic cross-sectional view illustrating the configuration of the laser-beam printer. In FIG. 14, a main body 1000 of the LBP inputs and stores printing information (character codes, figure drawing instructions, image data and the like), external characters form data, macro-instructions and the like supplied from a host computer connected to the LBP, forms corresponding image patterns, form patterns and the like in accordance with the information, and forms an image on recording paper or the like, serving as a recording medium.

Operation switches, an LED (light-emitting diode) display unit and the like are disposed on an operation panel (operation unit) 1012. A printer control unit 1001 controls the entire LBP main body 1000, and analyzes character information and the like supplied from the host computer. The printer control unit 1001 mainly converts character information into a video signal representing corresponding character patterns and outputs the character patterns to a laser driver 1002.

The laser driver 1002 is a circuit for driving a semiconductor laser 1003, and performs on-off switching of a laser beam 1004 emitted from the semiconductor laser 1003 in accordance with the input video signal. The laser beam 1004 is deflected in directions leaving the plane of FIG. 14 by a rotating polygonal mirror 1005, in order to perform scanning exposure on an electrostatic drum 1006. An electrostatic latent image of an image pattern is thereby formed on the electrostatic drum 1006. The latent image is developed by a developing unit 1007 disposed around the electrostatic drum 1006, and the developed image is then transferred onto recording paper. A mechanism for detecting the remaining amount of a toner used for forming the image on the recording paper is provided within the developing unit 1007, and the remaining amount of the toner is detected by the printer control unit 1001.

Cut-sheet recording paper is used as the recording paper to which the image is to be transferred. Sheets of the cut-sheet recording paper are accommodated in a sheet cassette 1008 mounted in the LBP main body 1000, and are individually received into the LBP main body 1000 by a sheet feeding roller 1009 and conveying rollers 1010 and 1011. The received sheet is supplied to the electrostatic drum 1006.

A sheet-conveyance detection mechanism (not shown) for detecting whether or not the recording paper is normally conveyed is provided at each roller portion, so as to detect abnormality when, for example, the recording paper is jammed. A sheet-remaining-amount detection mechanism (not shown) is provided in the sheet cassette 1008, so that the printer control unit 1001 can detect the remaining amount of sheets of the paper.

A card slot (not shown) is provided in the LBP main body 1000. In order to provide fonts other than incorporated fonts, an optional-font card, a control card (emulation card) having a different language system (PDL), or a memory card capable of holding form data and font data can be connected to the card slot.

Figure 1:
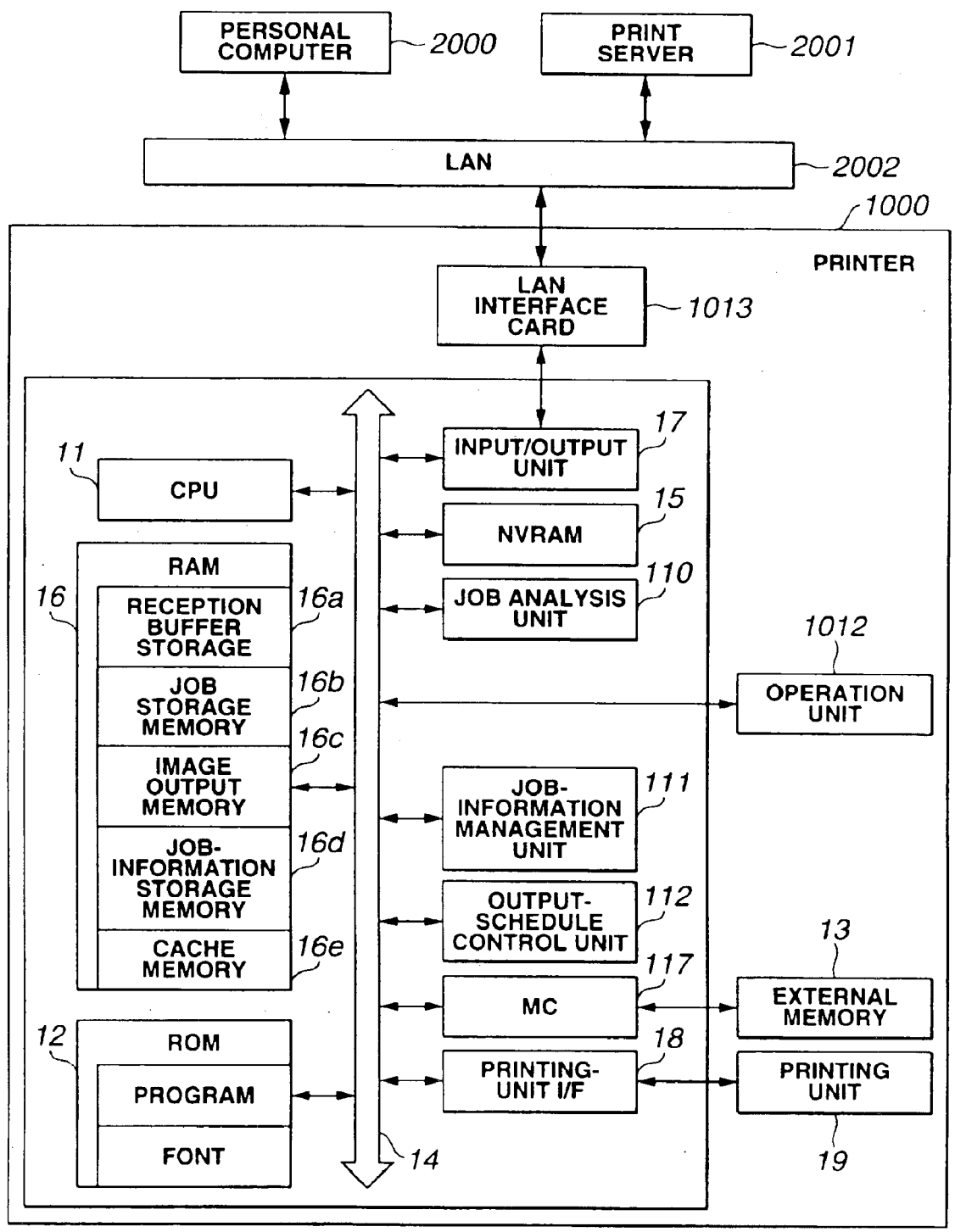
FIG. 1 is a block diagram illustrating the configuration of an image output system.

Next, the configuration of the image output system including the above-described LBP will be described. FIG. 1 is a block diagram illustrating the configuration of the image output system.

A printing job is generated by converting data generated by an application program operating in a personal computer (PC) 2000 or a print server 2001 connected to a network into PDL data for the printer control unit 1001, and is stored in a print spooler (a job spool region 24d) within a hard disk (HD) 24 (see FIG. 2) incorporated in the print server 2001.

The processing of the PC 2000 and the print server 2001 is realized by a function provided by a network operating system. The print server 2001 executes communication control processing via a LAN interface card 1013 and a LAN 2002 incorporated in the printer 1000, and transfers the printing job to the printer control unit 1001. The printing job indicates an input-page group input in units of data framed by a job starting instruction and a job ending instruction for defining an input page.

In the printer control unit 1001, a printer CPU (central processing unit) 11 inclusively controls access to each device connected to a system bus 14 based on a control program stored in a ROM (read-only memory) 12, and outputs an image signal, serving as output information, to a printing unit (printer engine) 19 connected via a printing-unit interface (I/F) 18.

Figure 4:
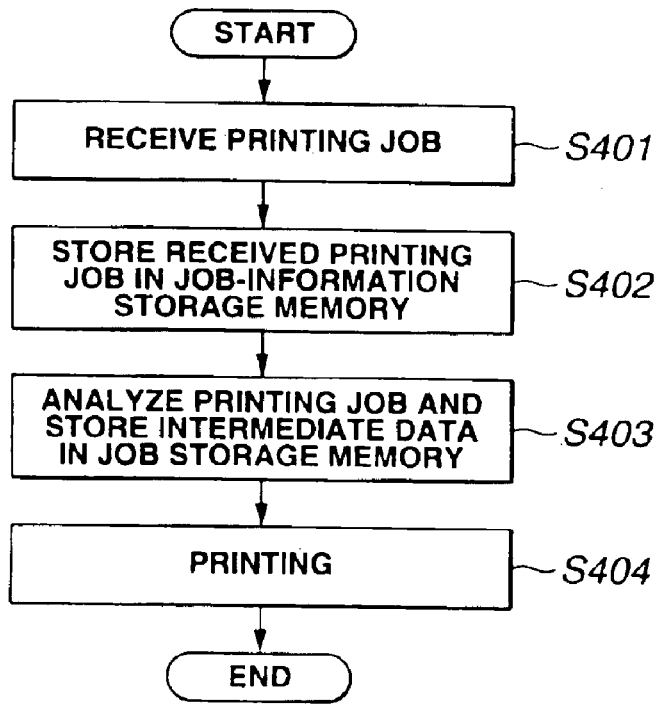
FIG. 4 is a flowchart illustrating printing-job transfer processing executed by a printer control unit.
Figure 8:
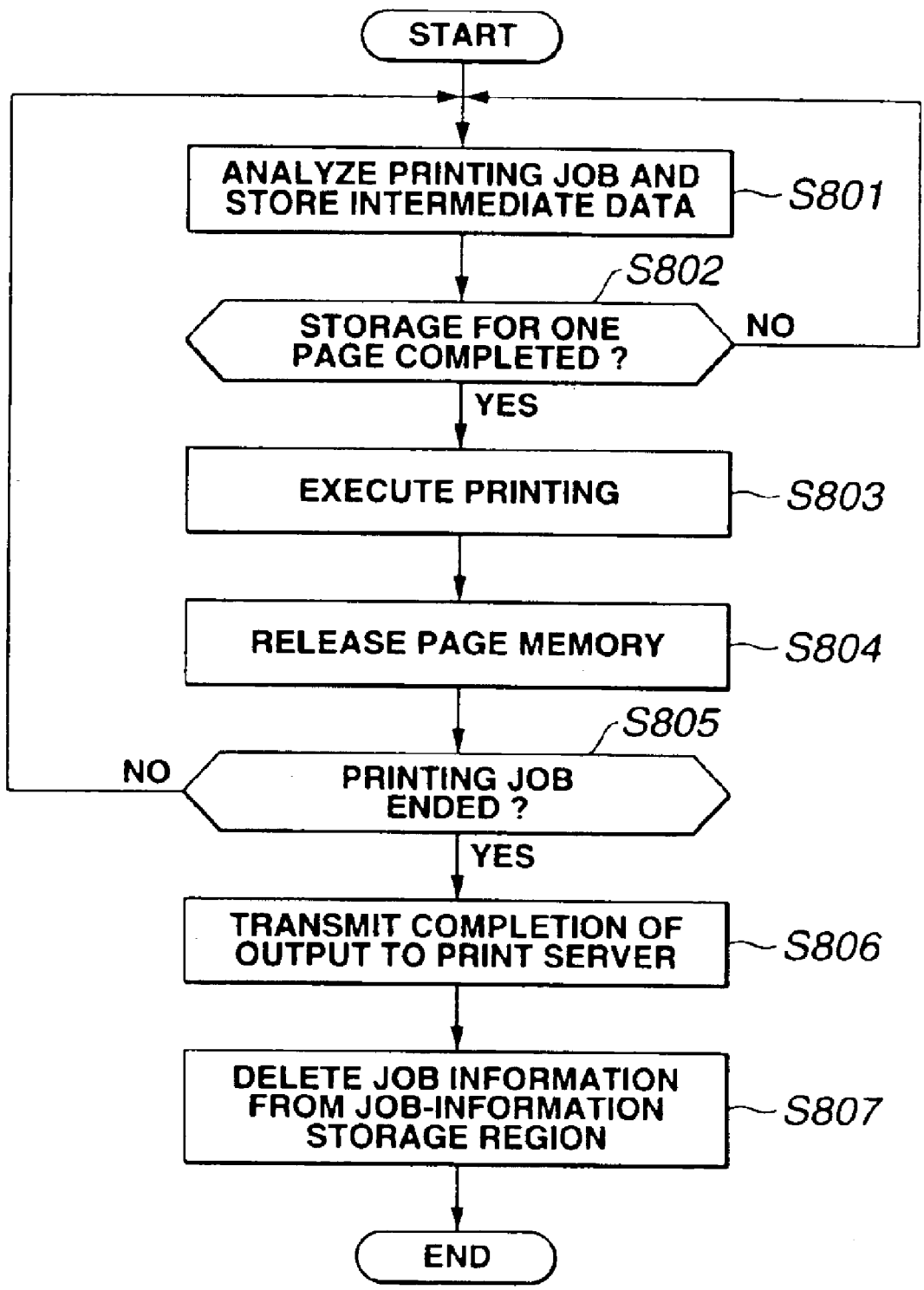
FIG. 8 is a flowchart illustrating an operation processing procedure executed by the printer control unit when a printing job is received by an input/output unit.

Control programs for flowcharts shown in FIGS. 4 and 8, an image forming program for forming a bit-map image to be transferred to the printing unit 19, and the like are stored in a program ROM of the ROM 12. Font data (outline data or dot font data) used when forming an output image, and the like are stored in a font ROM of the ROM 12.

The CPU 11 can perform communication processing with the print server 2001 via the LAN interface card 1013 and the input/output unit 17.

A RAM (random access memory) 16 operates as a main memory, working areas, a reception buffer storage and the like of the CPU 11, and is configured so as to be able to expand the memory capacity by an optional RAM to be connected to an extension port (not shown). The RAM 16 is used as a reception buffer storage 16a for spooling data input to the input/output unit 17, a job storage memory 16b for storing data to be printed in the form of intermediate codes or an intermediate bit-map image, an image output memory 16c where a bit-map image to be output to the printing unit 19 is generated, a job-information storage memory 16d for storing the title of a printing job input by a job-information management unit 111, a status of processing, and the like, a cache memory 16e for temporarily storing data to be registered, such as external characters, form images and the like stored in an external memory 13, and the like.

The external memory 13 is connectable as a secondary storage device, such as a hard disk or the like, subjected to access control by a memory controller (MC) 117. The external memory 13 is used as a registration memory for storing data to be registered transferred from an external-character file, a form file or the like of the host (personal) computer 2000. The external memory 13 is also used as a reception spool buffer storage for receiving and storing input data, and as a job storage memory for storing data to be printed and form data in the form of intermediate codes or an intermediate bit-map image.

A job analysis unit 110 is a job analysis processing module for generating intermediate page data to be output by analyzing data received in the reception buffer storage 16a within the RAM 16, and storing the generated data in the job storage memory 16b within the RAM 16.

Job information (the title of a job, the name of an output host apparatus, the name of an output user, the name of an output print server, the process status of a printing job) relating to all printing jobs stored in the reception buffer storage 16a and the job storage memory 16b within the RAM 16 is stored in the job-information management unit 111, and is updated whenever necessary in accordance with an input status of printing-job processing.

An output-schedule control unit 112 performs management, and control of change of schedules of printing jobs input within the printer control unit 1001, such as cancel of a printing job, exchange of two printing jobs, temporary interruption of specific printing-job processing, or the like, in accordance with an instruction from the print server 201 or an instruction input from the operation panel 1012.

As described above, the operation switches, the LED display unit and the like are disposed on the operation panel (operation unit) 1012.

The number of the above-described external memory is not limited to one. A plurality of external memories may be provided, or a plurality of external memories, each storing, for example, optional fonts and an emulation program for interpreting a printer control language for a different language system (PDL) in addition to incorporated fonts, may be connected. The external memory is not limited to a hard disk. For example, a flash memory card may be used as the external memory.

Figure 2:
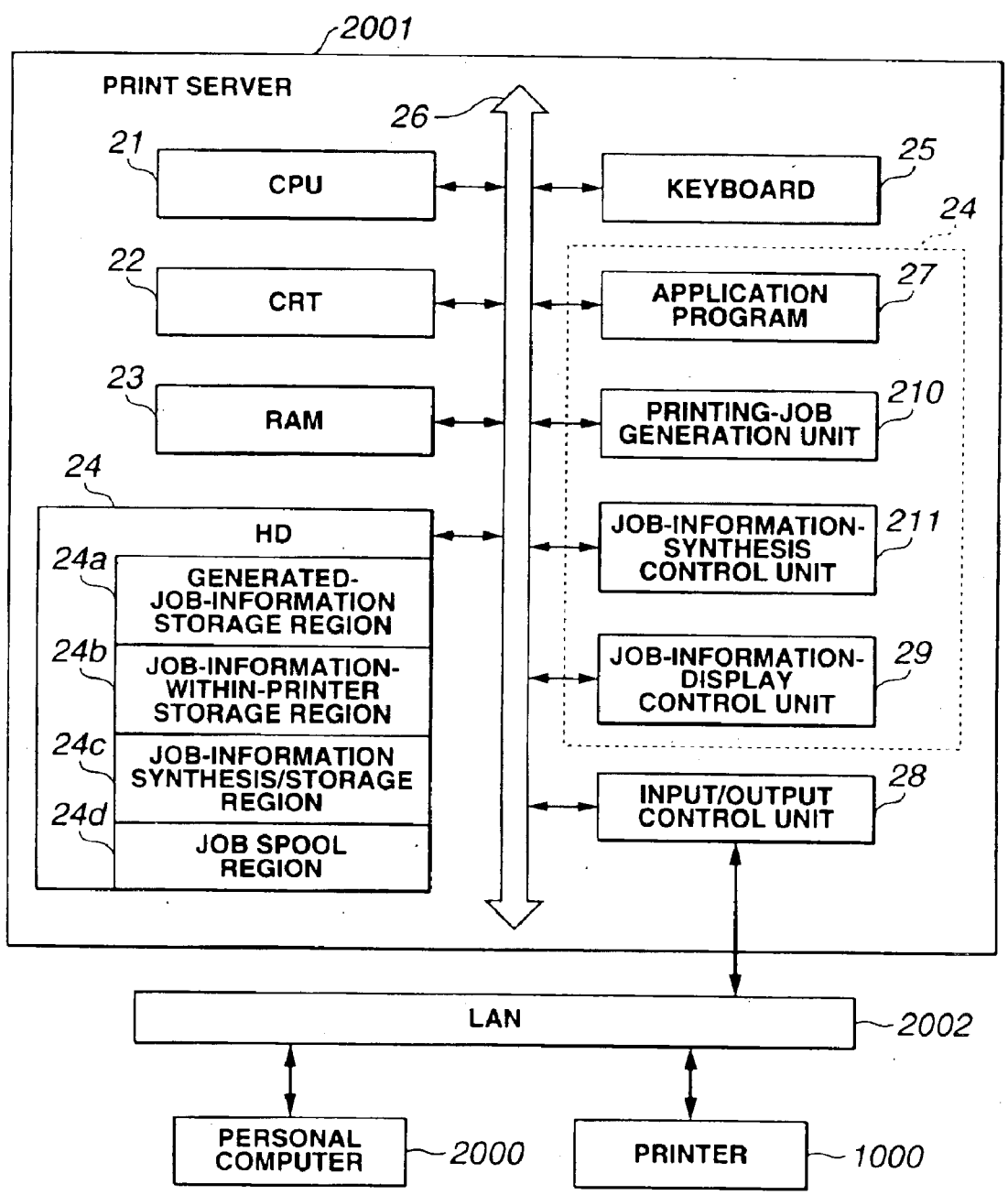
FIG. 2 is a block diagram illustrating the configuration of a print server.

FIG. 2 is a block diagram illustrating the configuration of the print server 2001, serving as a data transmission source. In the print server 2001, a CPU 21 reads and executes a control program stored on a hard disk (HD) 24 after loading the control program in a RAM 23, and inclusively controls access to each device connected to a system bus 26 based on the control program and an application program 27. The CPU 21 also executes various programs stored in a program region of the hard disk 24. Particularly, by executing a printer driver program (a printing-job generation unit 210), the CPU 21 generates a printing job to be transmitted to an output apparatus, and outputs the printing job to the printer 1000 connected via an input/output control unit 28.

The following programs for flowcharts shown in FIGS. 3 and 5 (to be described later) are stored in the program region of the hard disk (HD) 24. For example, a keyboard input program controls a keyboard 25 so that a user can input an operation for instructing generation of image data or printing processing from the keyboard 25. A CRT display program displays image data on the CRT 22 based on the input operation. The printer driver program (the printing-job generation unit 210) generates image data, generates a printing job from the image data and stores job information relating to the generated job information in a generated-job-information storage region 24a within the hard disk (HD) 24, based on the input operation. The application program 27 starts the printing-job generation portion 24a at a printing operation. A display control program (a job-information-synthesis control unit 211 and a job-information control unit 29) is started by an operating system (not shown) simultaneously when the generated printing job is stored in a spool region within the hard disk (HD) 24. The display control program acquires the job information stored in the RAM 16 within the printer 1000, synthesizes the acquired job information with generated-job information within the hard disk (HD) 24, and displays resultant job information on the CRT 22. A transfer control program instructs the input/output control unit 28 to transfer the printing job to the printer 1000.

By execution of the printer driver program or the display control program by the CPU 21, the printing-job generation unit 210, the job-information-synthesis control unit 211 and the job-information-display control unit 29 are realized.

The printing-job generation unit 210 is started by the application program 27, and is realized by the execution of the printer driver program for generating the printing job corresponding to the printer 1000 by the CPU 21. The printer driver program provides the application program 27 or the operating system with information relating to the configuration of the printer 1000, more specifically, a PDL version, the resolution which can be processed, information relating to the size of paper which can be output, information relating to incorporated fonts, and the like, and generates a printing job which can be processed by the printer 1000, based on data from the application program 27.

The job-information-synthesis control unit 211 is realized by execution of the display control program by the CPU 21. The job-information-synthesis control unit 211 compares/collates printing-job information stored in the generated-job-information storage region 24*a* with printing-job information stored in the job-information-within-printer storage region 24*b*, and synthesizes the two sets of printing-job information. The job-information-synthesis control unit 211 also generates printing-job information after the synthesis, i.e., printing-job information relating to all printing jobs to be processed by the printer 1000, and stores the generated information in the job-information synthesis/storage region 24*c*.

The printing-job information stored in the generated-job-information storage region 24*a* is generated by the printing-job generation unit 210 when the printing-job generation unit 210 generates the printing job. The printing-job information stored in the job-information-within-printer storage region 24*b* is generated by the job-information-synthesis control unit 211 by acquiring job information stored in the job-information storage memory 16*d* within the RAM 16 by communicating with the printer control unit 1001 independently of transfer of the printing job.

The job-information-display control unit 29 is realized by execution of the display control program capable of controlling a user-interface picture frame, by the CPU 21. The job-information-display control unit 29 displays printing-job information relating to all printing jobs to be processed by the printer 1000 which have been generated by the job-information-synthesis control unit 211, on the CRT 22. The job-information-display control unit 29 accepts a change of a schedule of a printing job displayed on the CRT 22 by the user's operation on the keyboard 25. When the printing job whose schedule has been changed is a printing job within the printer 1000, a command to instruct the change is transferred to the output-schedule control unit 112 of the printer control unit 1001 via the input/output control unit 28. The above-described display control program is automatically started from the printer driver program when the printer driver program generates the printing job. It is also possible to explicitly start the display control program by the user through the keyboard 25.

Figure 3:
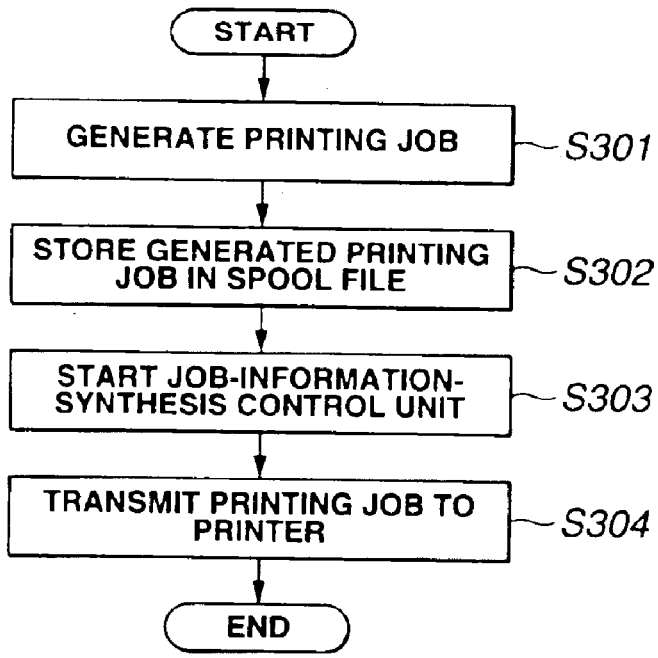
FIG. 3 is a flowchart illustrating printing-job transfer processing executed by the print server.

FIGS. 3 and 4 are flowcharts illustrating sets of printing-job transfer processing executed by the printing-job generation unit 210, serving as a data transmission source, and by the printer control unit 1001, serving as a data reception source, respectively. FIG. 3 is a flowchart illustrating printing-job transfer processing to be executed by the printer server 2001. The processing program for this processing is stored on the hard disk 24 of the print server 2001, and is executed by the CPU 21. FIG. 4 is a flowchart illustrating printing-job transfer processing to be executed by the printer control unit 1001. The processing program for this processing is stored in the program ROM of the ROM 12 of the printer 1000.

First, when the user instructs execution of printing of an application file by operating the keyboard 25, the printing-job generation unit 210 is started by the application program 27, and generates printing-job data which can be processed by the printer (step S301).

The generated printing-job data is stored into the job spool region 24*d* of the hard disk 24. At that time, information, such as the title of the generated printing job, the user name, the name of the output host apparatus, the name of the print server, the process status of the job within the job spool region (in storage, awaiting transfer, in transfer, or in deletion), and the like, is stored in a generated-job management region within the same job spool region (step S302). Such printing-job information is also transferred to the printer 1000 together with the printing job.

When the printing job has been stored in the spool file, the printing-job generation unit 210 starts the job-information-synthesis control unit 211. Then, the job-information-synthesis control unit 211 starts processing of storing the printing job in the generated-job-information storage region 24*a* (step S303). The operation of the job-information-synthesis control unit 211 will be described later.

When the printing job has been stored in the job spool region 24*d* within the hard disk 24, the input/output control unit 28 transfers the printing job to the printer 1000 (step S304). Thus, the processing is terminated.

In the printer 1000, when the printing job has been transferred from the print server 2001 to the printer 1000 according to communication between the LAN interface card 1013 and the input/output control unit 28, the input/output unit 17 stores the received printing job in the reception buffer storage 16*a* within the RAM 16 (step S401).

When the input/output unit 17 stores the printing job (control codes indicating printing positions, character codes and the like) transferred from the input/output control unit 28 in the reception buffer storage 16*a*, the job-information management unit 111 also stores job information (the title of the job, the user name, the name of the output host apparatus, and the name of the print server) transferred together with the printing job in the job-information storage memory 16*d* within the RAM 16 (step S402).

The printing job is analyzed and converted into intermediate codes by the job analysis unit 110. The intermediate codes are classified in units of a band corresponding to a printing position assigned by a control code or the like, and is stored into the job storage memory 16*b* within the RAM 16 (step S403). At that time, the intermediate codes are stored in units of a page as intermediate codes of the same page until a page ending control code, such as a page-break instruction or the like, in the printing data is detected.

The intermediate codes stored in the job storage memory 16*b* within the RAM 16 are subjected to bit-map development. The generated bit-map data is stored into the image output memory 16*c*, and is output to the printing unit 19 via the printing-unit I/F 18 (step S404). Then, an image based on the bit-map data is printed on paper. Then, the processing is terminated.

Figure 5:
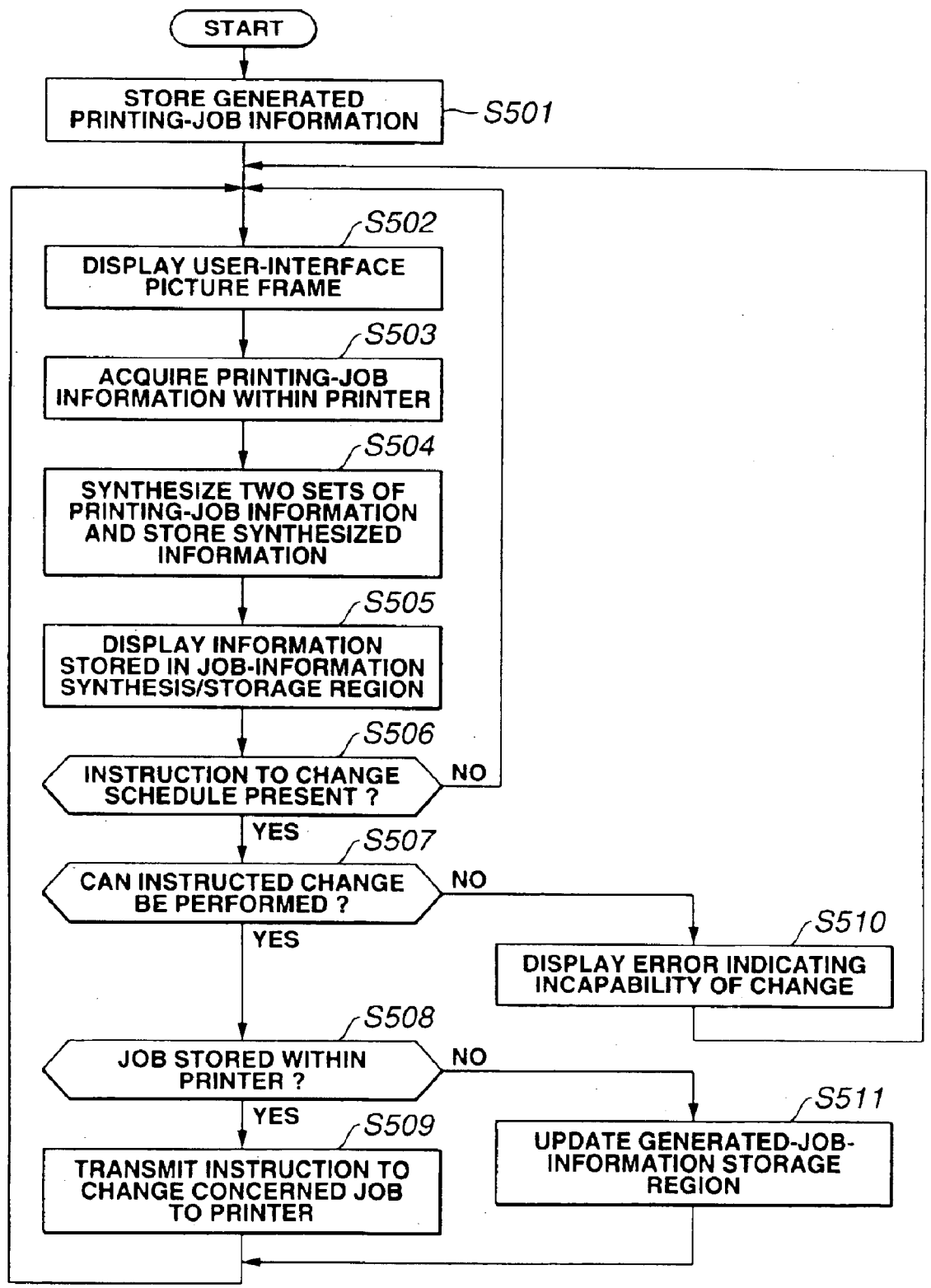
FIG. 5 is a flowchart illustrating a processing procedure in a job-information-synthesis control unit and a job-information-display control unit.

FIG. 5 is a flowchart illustrating a processing procedure in the job-information-synthesis control unit 211 and the job-information-display control unit 29. This processing is realized by the display control program for printing-job information. As described above, the display control program is stored on the hard disk (HD) 24 within the print server 2001, and is executed after being loaded in the RAM 23 by the CPU 21.

First, when the job-information-synthesis control unit 211 is started by the printing-job generation unit 210, the printing-job information stored in step S302 in the generated-job management region within the job spool region is stored into the generated-job-information storage region 24a within the hard disk 24 (step S501).

Then, the job-information-display control unit 29 displays a user-interface picture frame for displaying printing-job information and accepting an instruction to change a printing job from the user on the CRT 22 (step S502).

Then, the job-information-synthesis control unit 211 acquires printing-job information stored in the job-information storage memory 16d of the RAM 16 within the printer control unit 1001 via the input/output control unit 28, and stores the acquired information in the job-information-within-printer storage region 24b within the hard disk 24 (step S503).

Then, By comparing/collating generated-printing-job information (printing-job information stored in the generated-job-information storage region 24a will be hereinafter termed "generated-printing-job information") and job-within-printer information (printing-job information stored in the job-information-within-printer storage region 24b will be hereinafter termed "job-within-printer information") within the hard disk 24 which have been obtained in the above-described manner, with each other, job information relating to all printing jobs to be subjected to output processing by the printer 1000 is stored into the job-information synthesis/storage region 24c within the hard disk 24 (step S504). At that time, sets of job information relating to overlapped jobs are synthesized.

Job information after the synthesis is displayed on the user-interface picture frame displayed on the CRT 22 (step S505).

Then, it is determined whether or not the user has instructed a change in an output schedule (cancel of output, temporary interruption of output, or the like) of the printing job being displayed on the user-interface picture frame using the keyboard 25 (step S506). If the result of the determination in step S506 is negative, the process returns to step S502, and the display is continued while updating the status of processing of outputting the printing job of the printer 1000 by repeatedly executing the processing of steps S502–S505.

If the result of the determination in step S506 is affirmative, it is then determined whether or not the printing job instructed to be changed can be changed (step S507). If the result of the determination in step S507 is negative, an error indicating incapability of change is displayed (step S510).

If the result of the determination in step S506 is affirmative, it is then determined whether or not the printing job instructed to be changed is a job already stored in the reception buffer storage 16a or the job storage memory 16b within the printer 1000 (step S508). If the result of the determination in step S508 is affirmative, a command to instruct a change of the concerned job is transmitted to the printer 1000 via the input/output control unit 28 (step S509).

If the result of the determination in step S508 is negative, i.e., if the concerned printing job is stored in the job spool region 24d within the hard disk 24 of the print server 2001, the job-information-display control unit 29 executes processing of changing the schedule of the printing job, and updates the generated-job information stored in the generated-job-information storage region 24a within the hard disk 24, based on the result of the change (step S511). Then, the processing is terminated.

FIGS. 6A, 6B and 6C are diagrams illustrating the generated-job-information storage region 24a, the job-information-within-printer storage region 24b, and the job-information synthesis/storage region 24c, respectively. The generated-job-information storage region 24a stores printing-job information generated by the printing-job generation unit 210 within the print server 2001, and is configured as shown in FIG. 6A. The title of each printing job, the name of the user of the printing job, the name of the host apparatus which has output the printing job, the name of the print server storing the printing job, and the state of the printing job are stored in the generated-job-information storage region 24a. In FIG. 6A, printing-job information in which the job title is "job B", the user name is "user B", the name of the output host apparatus is "host apparatus B", the print-server name is "server A", and the process status is "in transfer" is stored. Similarly, printing-job information having "job C", "user A", "host apparatus A", "server A", and "awaiting transfer" is stored.

The job-information-within-printer storage region 24b stores printing-job information stored in the job-information storage memory 16d within the RAM 16 of the printer 1000 and acquired via the input/output control unit 28, and is configured as shown in FIG. 6B. The job-within-printer information is updated by notification by the LAN interface card 1013 to the print server 2001 utilizing the SNMP when processing information (completion of reception, completion of job analysis, completion of output, or the like) of the printer 1000 has changed, or by periodic poling by the input/output control unit 28 from the printer 1000.

The title of each printing job, the name of the user of the printing job, the name of the host apparatus which has output the printing job, the name of the print server storing the printing job, and the state of the printing job are stored in the job-information-within-printer storage region 24b. In FIG. 6B, printing-job information in which the job title is "job A", the user name is "user A", the name of the output host apparatus is "host apparatus A", the print-server name is "server A", and the process status is "in output" is stored. Similarly, printing-job information having "job Y", "user Y", "host apparatus Y", "server A", and "awaiting output", and printing-job information having "job B", "user B", "host apparatus B", "server A", and "in reception" are stored.

The job-information synthesis/storage region 24c is obtained by synthesizing the generated-job-information storage region 24a and the job-information-within-printer storage region 24b. The job-information synthesis/storage region 24c stores printing-job information relating to all printing jobs being processed by the print server 2001 and the printer 1000, and is configured as shown in FIG. 6C. The number of each printing job, the title of the printing job, the name of the user of the printing job, the name of the host apparatus which has output the printing job, the name of the print server storing the printing job, and the state of the printing job are stored in the job-information synthesis/storage region 24c. In FIG. 6C, printing-job information in which the job number is "1", the job title is "job A", the user name is "user A", the name of the output host apparatus is "host apparatus A", the print-server name is "server A", and the process status is "in output" is stored. Similarly, printing-job information having "2", "job Y", "user Y", "host apparatus Y", "server A", and "awaiting output", printing-job information having "3", "job B", "user B", "host apparatus B", "server A", and "in transfer", and printing-job information having "4", "job C", "user A", "host apparatus A", "server A", and "awaiting transfer" are stored. Such job information is displayed on the CRT 22 by the job-information-display control unit 29, and is utilized by the user for instructing a change in the schedule of the printing job.

Figure 7A:
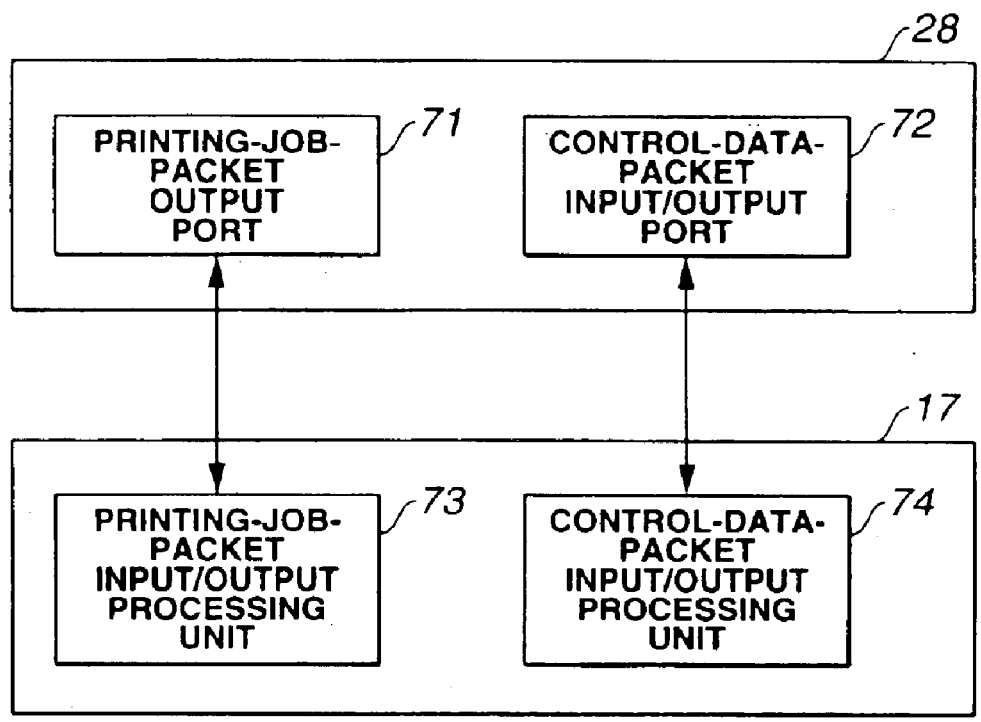
FIGS. 7A–7C are diagrams illustrating a manner of transfer of printing data and control data for changing a schedule between an input/output control unit within a print server and an input/output unit within a printer.
Figure 7B:
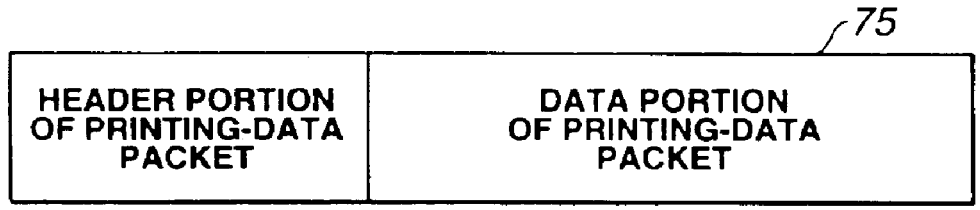
Figure 7C:
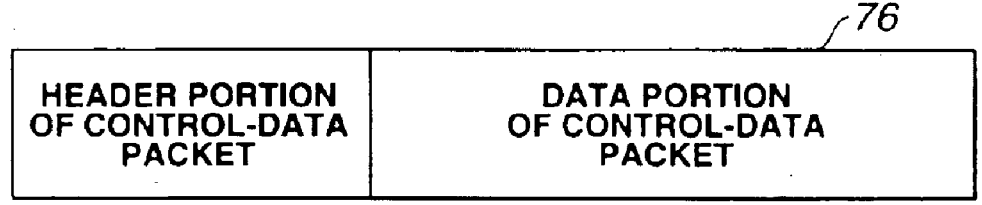

FIGS. 7A–7C are diagrams illustrating how printing data and control data for changing a schedule are transferred between the input/output control unit 28 within the print server 2001 and the input/output unit 17 within the printer 1000.

A printing job stored in the job spool region 24d within the hard disk 24 is converted into a printing-data packet 75 in a printing-job-packet output port 71, and is transmitted to a printing-job-packet input/output processing unit 73 within the printer 1000.

On the other hand, as shown in the processing of step S509, a command to instruct a change of the schedule for the printing job stored within the printer 1000 and being subjected to printing processing is transmitted from the job-information-display control unit 29 to a control-data-packet input/output processing unit 74 via a control-data-packet input/output port 72 in accordance with an instruction from the user.

By performing processing of allocating each packet by referring to the packet header of the packet by the input/output unit 17, a control-data packet 76 and a printing-data packet 75 can be transmitted in a state of being mixed. It is thereby possible to transmit control data without interrupting transmission of a printing job. FIG. 7B illustrates the structure of a printing-data packet, and FIG. 7C illustrates the structure of a control-data packet. An identifier indicating a packet for printing data is stored in a header portion of the printing-data packet, and printing data itself is stored in a data portion of the printing-data packet. An identifier indicating a packet for control data and an identifier indicating the type of control data are stored in a header portion of the control-data packet, and parameters of the control data, and the like are stored in a data portion of the control-data packet.

The system is configured such that control data can be transmitted/received even if the reception buffer storage 16a within the RAM 16 of the printer 1000 is full. Hence, it is also possible to perform control of allocation for a printing job already stored in the job storage memory 16b within the RAM 16 of the printer 1000.

FIG. 8 is a flowchart illustrating an operation processing procedure to be executed by the printer control unit 1001 when a printing job has been received by the input/output unit 17. A processing program for this flowchart is stored in the program ROM within the ROM 12, and is executed by the CPU 11.

When the printing job has been input from the print server 2001, the printing-job-packet input/output processing unit 73 of the input/output unit 17 receives the printing job and stores the received job in the reception buffer storage 16a within the RAM 16. At that time, as shown in FIG. 4, job information relating to the received printing job is stored into the job-information storage memory 16d within the RAM 16. Then, the processing shown in FIG. 8 is started.

Then, the job analysis unit 110 reads the printing job (control codes indicating printing positions, character codes and the like) stored in the reception buffer storage 16a, generates intermediate data, and stores the generated data in the job storage memory 16b within the RAM 16 (step S801). The intermediate data is stored by being classified in units of a band corresponding to a printing position assigned by a control code or the like. It is then determined whether or not a page ending control code, such as a page-break command or the like, has been detected, i.e., whether or not intermediate data for one page has been stored in the job storage memory 16b (step S802). If the result of the determination in step S802 is negative, intermediate data is stored in units of a page as intermediate data for the same page, until the result of the determination in step S802 becomes affirmative.

When at least intermediate data for one page has been stored in the job storage memory 16b within the RAM 16, the intermediate data is sequentially subjected to bit-map development in the bit-map memory within the RAM 16. The generated bit-map image data is transmitted to the printing unit 19 via the printing-unit I/F 18, in order to cause the printing unit 19 to perform printing (step S803). Upon completion of output for one page, an intermediate-page memory within the job storage memory 16b is released in order to store succeeding intermediate data (step S804).

The succeeding page outputting processing is repeated until it is determined that all page data within the printing job ha been normally output in the above-described manner (step S805).

When it has been determined in step S805 that all page data within the printing job has been normally output, completion of output of the printing job is notified to the print server 2001 via the LAN interface card 1013 (step S806). At that time, the completion of output of the printing job is notified to the print server 2001 using the SNMP.

Then, printing-job information relating to the printing job whose output has been completed is deleted from the printing-job information stored in the job-information storage memory 16d within the RAM 16 (step S807), and the processing of the printing job is completed.

Figure 9:
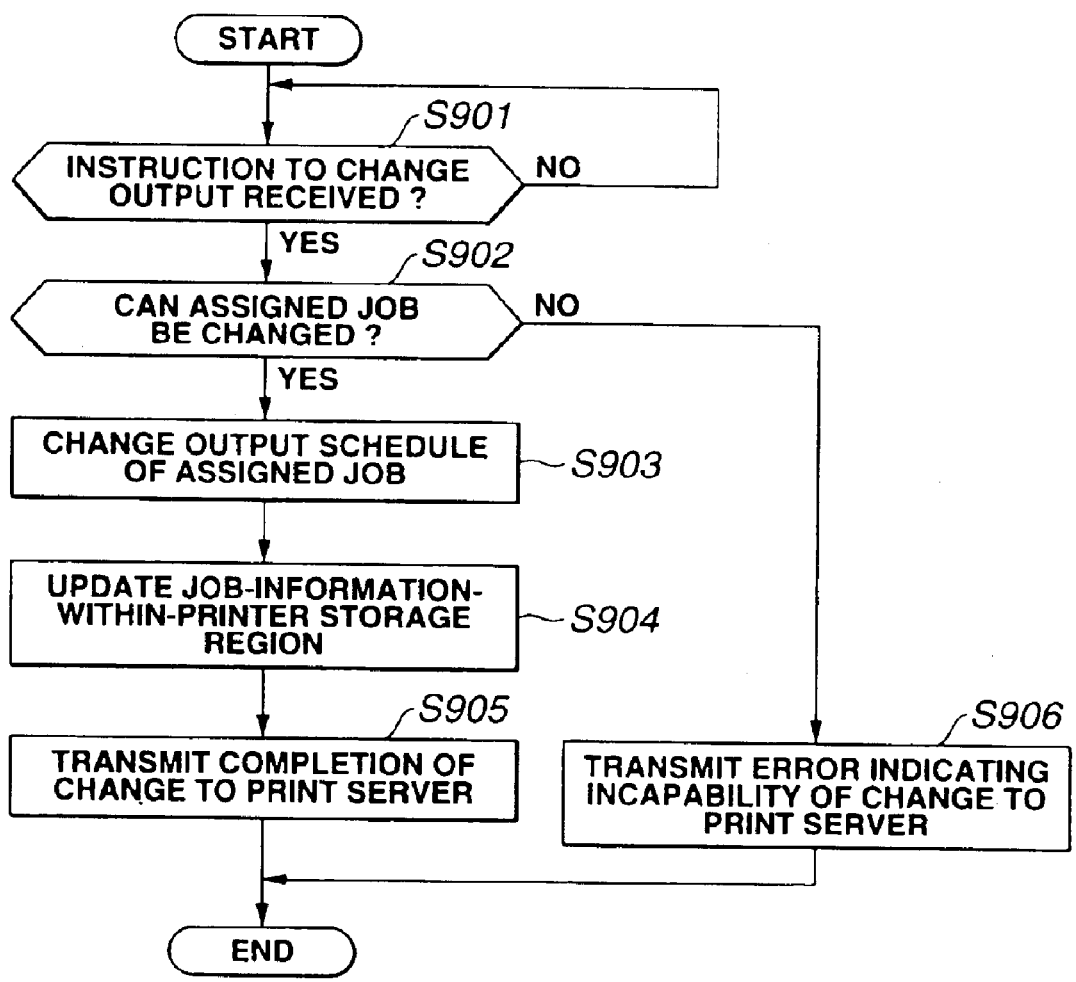
FIG. 9 is a flowchart illustrating an operation processing procedure executed by the printer control unit when an instruction to change output is received by the input/output unit.

FIG. 9 is a flowchart illustrating an operation processing procedure to be executed by the printer control unit 1001 when an instruction to change output has been received by the input/output unit 17. This processing is schedule changing processing of determining whether or not a change of the schedule of a printing job stored within the printer 1000 can be accepted, based on the control level. A processing program for this processing is stored in the ROM 12 within the printer 1000, and is executed by the CPU 11.

First, it is determined whether or not the control-data-packet input/output processing unit 74 (see FIG. 7A) of the input/output unit 17 within the printer control unit 1001 has received an instruction to change output (a change-instruction packet) (step S901). When it has been determined in step S508 shown in FIG. 5 that the printing job has already been transferred to the printer 1000, the change-instruction packet is transmitted from the job-information-display control unit 29 in the processing of step S509.

When an instruction to change output has been received, the job-information management unit 111 determines whether or not the schedule of the printing job assigned by control data of the change-instruction packet can be changed, based on an instruction from the output-schedule control unit 112 (step S902). The assignment of the printing job by the control data is performed according to job information (the job title, the user name, the name of the host apparatus, and the print-server name).

The determination in step S902 is performed by referring to job information (the job name, the user name, the name of the host apparatus, the print-server name, and the control level) stored in the job-information storage memory 16d.

When the concerned job is absent, when the concerned job has already been output, or when the control level of the concerned job cannot be changed, an error indicating incapability of change is transmitted to the print server which has provided the change-instruction packet, via the LAN interface card 1013 (step S906).

On the other hand, if the result of the determination in step S902 is affirmative, the output-schedule control unit 112 performs a change of the schedule of the printing job (cancel, temporary interruption, exchange of the order, or the like) (step S903).

Upon completion of the schedule changing processing, the job-information management unit 111 updates printing-job information in the job-information storage memory 16d within the RAM 16 (step S904). Furthermore, completion of the schedule changing processing is transmitted to the print server that has instructed the change (step S905).

When the print server has received the notification of the completion of the change, the job-information-synthesis control unit 211 updates job information within the job-information synthesis/storage region 24c, and the job-information-display control unit 29 displays the notification of the completion of the change on the CRT 22. Thus, the user is notified of the completion of the schedule changing processing.

Although in the above-described embodiment, the job-information management unit 111 determines whether or not an instruction to change a schedule can be performed using printing-job information (the job title, the user name, the name of the host apparatus, the print-server name, and the control level), the determination may be performed using a part or a combination of the above-described sets of information. For example, the instruction may be accepted only when the user names in two sets of printing-job information coincide. In another approach, by allowing assignment of one of various fine control levels for execution of a schedule, and allocating a schedule change command which can be instructed, to each user, functions may be partly limited.

Figure 10:
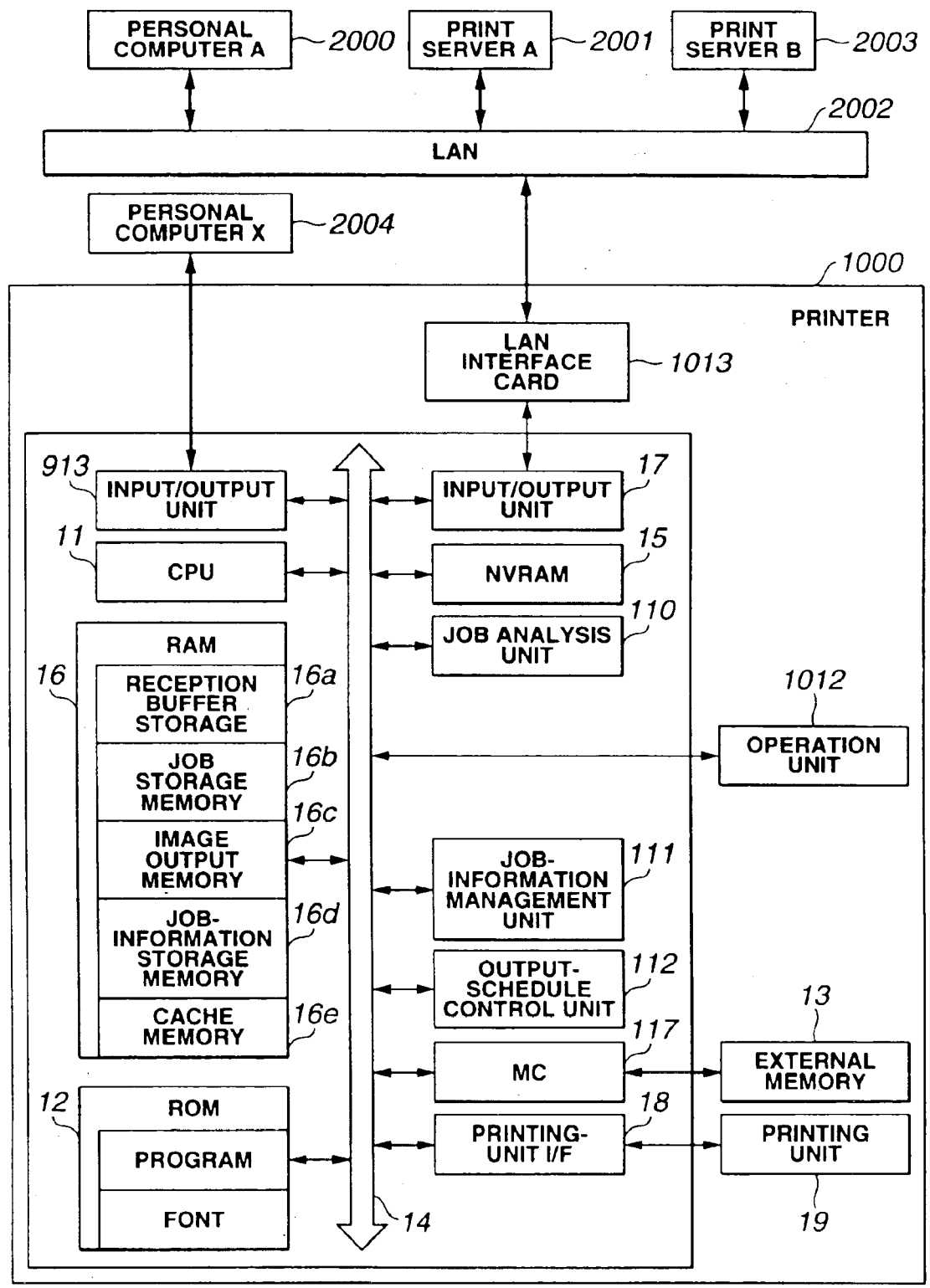
FIG. 10 is a block diagram illustrating the configuration of an image output system in which a plurality of apparatuses, each for transmitting a printing job, are present.

In the above-described embodiment, transmission only from one print server is assumed. However, a plurality of apparatuses, each transmitting a printing job to the printer 1000, may be provided. FIG. 10 is a block diagram illustrating the configuration of an image output system in which a plurality of apparatuses, each transmitting a printing job, are present. In FIG. 10, the same components as those shown in FIG. 1 are indicated by the same reference numerals.

In FIG. 10, a printing job is transmitted from a personal computer X 2004, a print server A 2001 or a print server B 2003 to a printer 1000.

The processing of the personal computer A 2000 and the print server A 2001 is realized as a function provided by a network operating system. The print server A 2001 executes communication control processing via a LAN interface card 1013 and a LAN 2002 incorporated in the printer 1000, and transfers the printing job to a printer control unit 1001. Since the print server B 2003 operated in the entirely same manner, further description thereof will be omitted.

A printing job is also generated in the personal computer X 2004 in the same manner. The personal computer X 2004 is directly connected to the printer control unit 1001, and the generated printing job is directly input without intervention of a LAN.

The printing job indicates an input-page group input in units of data framed by a job starting instruction and a job ending instruction for defining an input page.

In the printer control unit 1001, a printer CPU 11 inclusively controls access to each device connected to a system bus 14 based on a control program stored in a ROM 12, and outputs an image signal, serving as output information, to a printing unit (printer engine) 19 connected via a printing-unit interface (I/F) 18.

Control programs for flowcharts shown in FIGS. 3, 4, 8 and 9, an image forming program for forming a bit-map image to be transferred to the printing unit 19, and the like are stored in a program ROM of the ROM 12. Font data (outline data or dot font data) used when forming an output image, and the like are stored in a font ROM of the ROM 12.

The CPU 11 can perform communication processing with the print server A 2001 and the print server B 2003 via the input/output unit 17 and the LAN interface card 1013. The CPU 11 can also perform communication processing with the personal computer X 2004 via a parallel port of an input/output unit 913.

A job-information management unit 111 updates job information (the titles of jobs, the names of output host apparatuses, the names of output users, the names of output print servers, the process statuses of printing jobs, and the schedule control level) relating to all printing jobs stored in the reception buffer storage 16a and the job storage memory 16b within the RAM whenever necessary in accordance with the status of processing of an output printing job.

An output-schedule control unit 112 performs management, and control of change of schedules of printing jobs input within the printer control unit 1001, in accordance with an instruction from the print server or an instruction input from an operation panel 1012. For example, the output-schedule control unit 112 executes scheduling control of a printing job already stored within the printer 1000, such as cancel of a printing job, exchange of two printing jobs, temporary interruption of specific printing-job processing, or the like.

FIGS. 11A–11C are diagrams illustrating information stored on a hard disk 24 within the print server A 2001. FIGS. 12A–12C are diagrams illustrating information stored on a hard disk 24 within the print server B 2003. A personal computer B (not shown) is connected to the print server A 2001, and a printing job can be transmitted from the personal computer B to the printer 1000 via the print server A 2001. A personal computer Y and a personal computer Z (not shown) are connected to the print server B 2003, and a printing job can be transmitted from each of these personal computers to the printer 1000 via the print server B 2003.

FIGS. 11A and 12A are diagrams, each illustrating a generated-job-information storage region 24a. The generated-job-information storage region 24a within the hard disk 24 stores printing-job information relating to a printing job generated by a printing-job generation unit 210 within a print server. The generated-job information includes schedule-control-level information. The user can set a schedule control level of a printing job stored in a job spool region 24d within the hard disk 24 at a job-information-display control unit 29. The set schedule control level is stored in the generated-job-information storage region 24a.

Schedule control levels include incapability of a change; a control level 1 (capable of changing a schedule of a printing job generated by another print server: incapable of job cancel), a control level 2 (capable of changing a schedule of a printing job generated by the user's own print server: capable of performing any one of instructions including job cancel). Control levels are set in accordance with each of a user, a host apparatus and a print-server manager.

FIGS. 11B and 12B are diagrams, each illustrating job-within-printer information. The job-within-printer information is job information relating to a printing job being processed which is stored in a job-information storage memory 16d of the RAM 16 within the printer 1000, and is acquired via an input/output control unit 28.

This job information is acquired from the LAN interface card 1013 within the printer 1000 utilizing the SNMP, is notified when the process state (completion of reception, completion of job analysis, completion of output, or the like) of the printer 1000 has changed, and is updated by periodic poling of the input/output control unit 28.

Schedule-control-level information of a printing job already stored within the printer is stored in a job-information-within-printer storage region 24*b*. Control levels which can be accepted from the print server or the operation panel are stored in the output-schedule control unit 112. Accordingly, the control level for the same printing job looks to differ between job information within printer of the print server A (see FIG. 11B) and job information within printer of the print server B (see FIG. 12B).

As described above, schedule control levels include incapability of change, a control level 1, a control level 2, and the like. The schedule control level is utilized for limiting execution of schedule change, according to the user name, the name of the host apparatus and the print-server name which are stored as job information, and information relating to the names of the user, the host apparatus and the print server that have instructed a schedule change.

FIGS. 11C and 12C are diagrams, each illustrating a job-information synthesis/storage region 24*c*. The job-information-synthesis control unit 211 synthesizes the job-information synthesis/storage region 24*c* by synthesizing the generated-job-information storage region 24*a* and the job-information-within-printer storage region 24*b* that have been described above. The job-information synthesis/storage region 24*c* stores information relating to all printing jobs being processed by the print server and the printer 1000. This job information is displayed on a CRT 22 by a job-information-display control unit 29. The user can input an instruction to change the schedule of the printing job on a user-interface picture frame by operating a keyboard 25.

The schedule control level within the job-information synthesis/storage region 24*c* is generated by synthesizing the generated-job information and the job-within-printer information within the print server. The control level for the same printing job looks to differ between synthesized job information of the print server A (see FIG. 11C) and synthesized job information of the print server B (see FIG. 12C).

Figure 13:
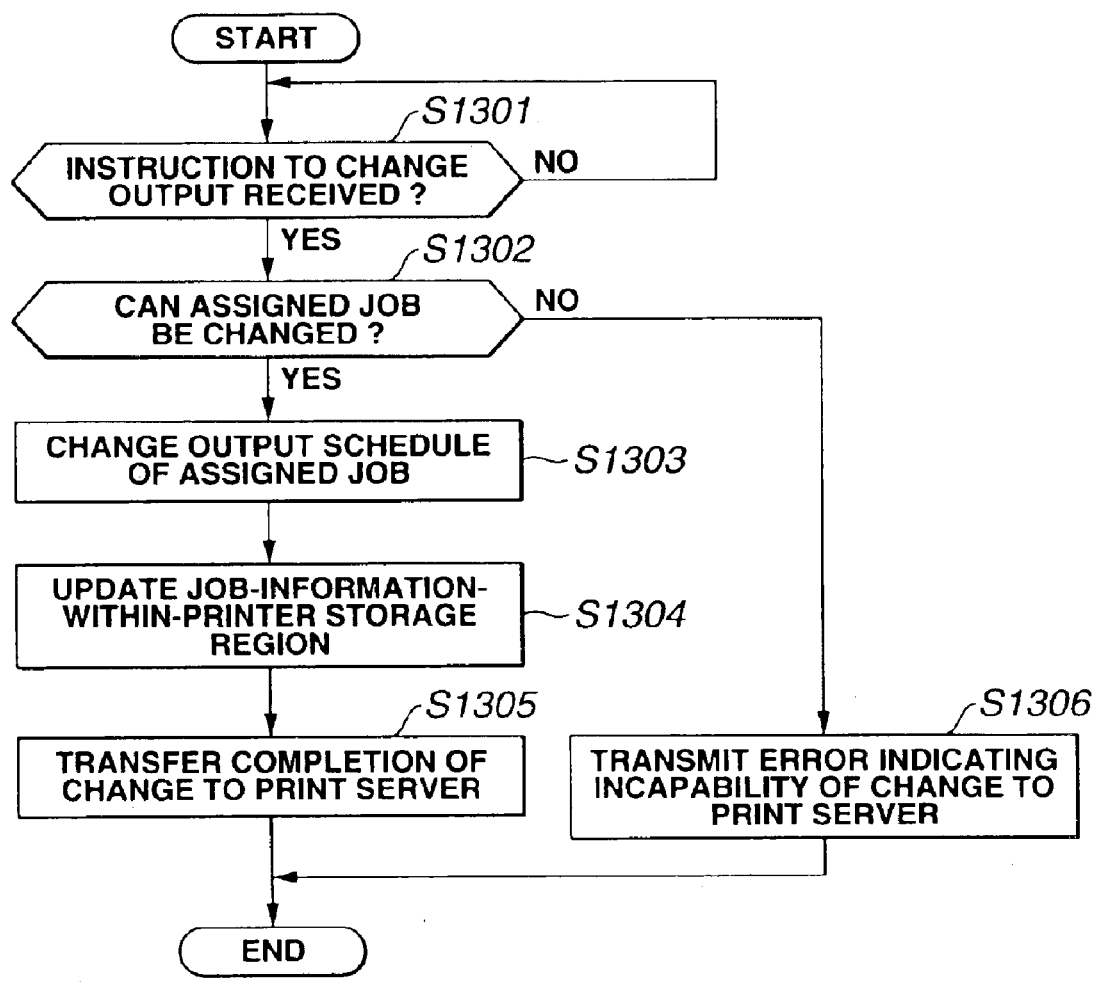
FIG. 13 is a flowchart illustrating a schedule changing processing procedure in which a printer control unit determines whether or not a change in a schedule of a printing job stored within a printer can be accepted, based on a control level.

FIG. 13 is a flowchart illustrating a schedule changing processing in which the printer control unit 1001 determines whether or not a change of the schedule of a printing job stored within the printer 1000 can be accepted, based on the control level. A processing program for this processing is stored in the ROM 12 within the printer 1000, and is executed by the CPU 11.

First, when it has been determined in the processing of step S508 shown in FIG. 5 that the printing job has already been transferred to the printer 1000, a packet for instructing a change in the output schedule is transmitted from the job-information-display control unit 29 in the processing of step S509. Accordingly, it is determined whether or not the control-data-packet input/output processing unit 74 (see FIG. 7A) of the input/output unit 17 within the printer control unit 1001 has received an instruction to change output (step S1301).

When an instruction to change output has been received, the job-information management unit 111 determines whether or not the schedule of the printing job assigned by control data of the change-instruction packet can be changed, based on an instruction from the output-schedule control unit 112 (step S1302). The assignment of the printing job by the control data is performed according to job information (the job title, the user name, the name of the host apparatus, and the print-server name).

This determination is performed by referring to job information (the job name, the user name, the name of the host apparatus, the print-server name, and the control level) stored in the job-information storage memory 16*d*.

When the concerned job is absent, when the concerned job has already been output, or when the control level of the concerned job cannot be changed, an error indicating incapability of change is transmitted to the print server which has provided the output-schedule-change instruction packet, via the LAN interface card 1013 (step S1306), and the processing is terminated.

On the other hand, if the result of the determination in step S1302 is affirmative, the output-schedule control unit 112 performs a change of the schedule of the printing job (cancel, temporary interruption, exchange of the order, or the like) (step S1303).

Upon completion of the schedule changing processing, the job-information management unit 111 updates printing-job information in the job-information storage memory 16*d* within the RAM 16 (step S1304). Furthermore, completion of the schedule changing processing is transmitted to the print server that has instructed the change (step S1305), and the processing is terminated.

When the print server has received the notification of the completion of the change, the job-information synthesis/storage region 24*c* is updated, and the job-information-display control unit 29 displays the notification of the completion of the change on the CRT 22. Thus, the user is notified of the completion of the processing.

Although the job-information management unit 111 determines whether or not an instruction to change a schedule can be performed using printing-job information (the job title, the user name, the name of the host apparatus, the print-server name, and the control level), the determination may be performed using a part or a combination of the above-described sets of information. For example, the instruction may be accepted only when the user names in two sets of printing-job information coincide. In another approach, by allowing assignment of one of various fine control levels for execution of a schedule, and allocating a schedule changing command which can be instructed to each user, functions may be partly limited.

In the above-described case, the printing-job generation unit, the job-information-synthesis control unit and the job-information-display control unit are executed by the print server 2001. However, these units may be executed by a personal computer, and synthesized printing-job information may be displayed on a display unit of the personal computer. Such an approach will now be described.

In the following printing system, a personal computer 3000, a print server 4000 and a printer 1000 are interconnected via a LAN 2002. The printer 1000 is equivalent to the printer 1000 shown in FIG. 1.

Figure 15:
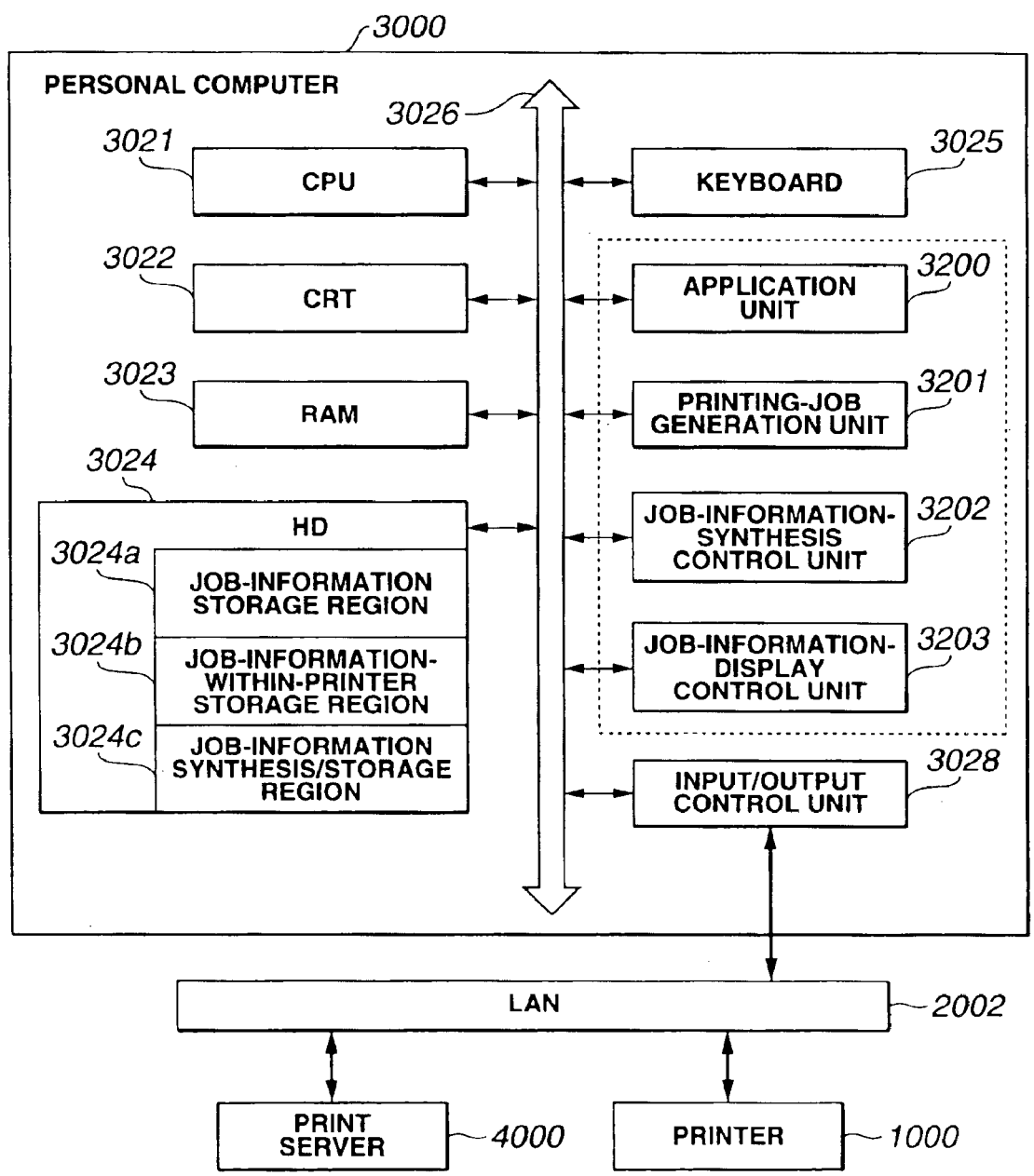
FIG. 15 is a block diagram illustrating the configuration of a personal computer.

FIG. 15 is a block diagram illustrating the configuration of the personal computer 3000. A CPU 3021 reads and executes a control program stored on a hard disk (HD) 3024 after loading the control program in a RAM 3023, and inclusively controls access to each device connected to a system bus 3026. The CPU 3021 also executes various programs stored in a program region of the hard disk 3024.

Various control programs are stored in the program region of the hard disk (HD) 3024. An application unit 3200, a printing-job generation unit 3201, a job-information-synthesis control unit 3202 and a job-information-display control unit 3203 are realized by execution of these control programs by the CPU 3021.

For example, a keyboard input program controls a keyboard 3025 so that a user can input an operation for instructing generation of image data or printing processing from the keyboard 25. A CRT display program displays image data on a CRT 3022 based on the input operation.

A printer driver program (a printing-job generation unit 3201) generates image data, generates a printing job from the image data and stores job information relating to the generated job information in a generated-job-information storage region 3024a within the hard disk (HD) 3024, based on the input operation.

An application program (an application unit 3200) starts a printing-job generation unit 3201 at a printing operation.

A job-information display program (a job-information-synthesis control unit 3202 and a job-information-display control unit 3203) is started by an operating system (not shown) simultaneously when the generated printing job is stored in a spool region within the hard disk (HD) 3024. The job-information display program acquires the job information stored in the RAM 3016 within the printer 1000, synthesizes the acquired job information with generated-job information within the hard disk (HD) 3024, and displays resultant job information on the CRT 3022.

A transfer control program instructs an input/output control unit 3028 to transfer the printing job to the print server 4000.

By execution of the printer driver program or the job-information display program by the CPU 3021, the printing-job generation unit 3201, the job-information-synthesis control unit 3202 and the job-information-display control unit 3203 are realized.

The printing-job generation unit 3201 is realized by the execution of the printer driver program for generating the printing-job corresponding to the printer 1000 by the CPU 3021. The printing-job generation unit 3201 provides the application unit 3200 or the operating system with information relating to the configuration of the printer 1000, more specifically, a PDL version, the resolution which can be processed, information relating to the size of paper which can be output, information relating to incorporated fonts, and the like, and generates a printing job which can be processed by the printer 1000, based on data from the application unit 3200.

The job-information-synthesis control unit 3202 is realized by execution of the job-information display program by the CPU 3021. The job-information-synthesis control unit 3202 compares/collates printing-job information stored in the job-information storage region 3024a with printing-job information stored in the job-information-within-printer storage region 3024b, and synthesizes the two sets of printing-job information. The job-information-synthesis control unit 211 also generates printing-job information after the synthesis, i.e., printing-job information relating to all printing jobs to be processed by the printer 1000, and stores the generated information in the job-information synthesis/storage region 3024c.

The printing-job information stored in the job-information storage region 3024a is acquired by the job-information synthesis unit 3202 by communicating with the print server 4000. The printing-job information stored in the job-information-within-printer storage region 3024b is acquired from the job-information storage memory 16d by the job-information-synthesis control unit 3202 by communicating with the printer control unit 1001 independently of transfer of the printing job.

The job-information-display control unit 3029 is realized by execution of a display control program capable of controlling a user-interface picture frame, by the CPU 3021. The job-information-display control unit 3029 displays printing-job information relating to all printing jobs to be processed by the printer 1000 which have been generated by the job-information-synthesis control unit 3202, on the CRT 3022.

The job-information-display control unit 3029 accepts a change of a schedule of a printing job displayed on the CRT 3022 by the user's operation on the keyboard 3025. When the printing job whose schedule has been changed is a printing job within the printer 1000, a command to instruct the change is transferred to the output-schedule control unit 112 of the printer control unit 1001 via the input/output control unit 3028. When the printing job whose schedule has been changed is a printing job within the print server 4000, a command to instruct the change is transferred to an output-schedule control unit 4024 within the printer server 4000 via the input/output control unit 3028.

The above-described job-information display program is automatically started from the printer driver program when the printer driver program generates the printing job. It is also possible to explicitly start the job-information display program by the user through the keyboard 3025.

Figure 16:
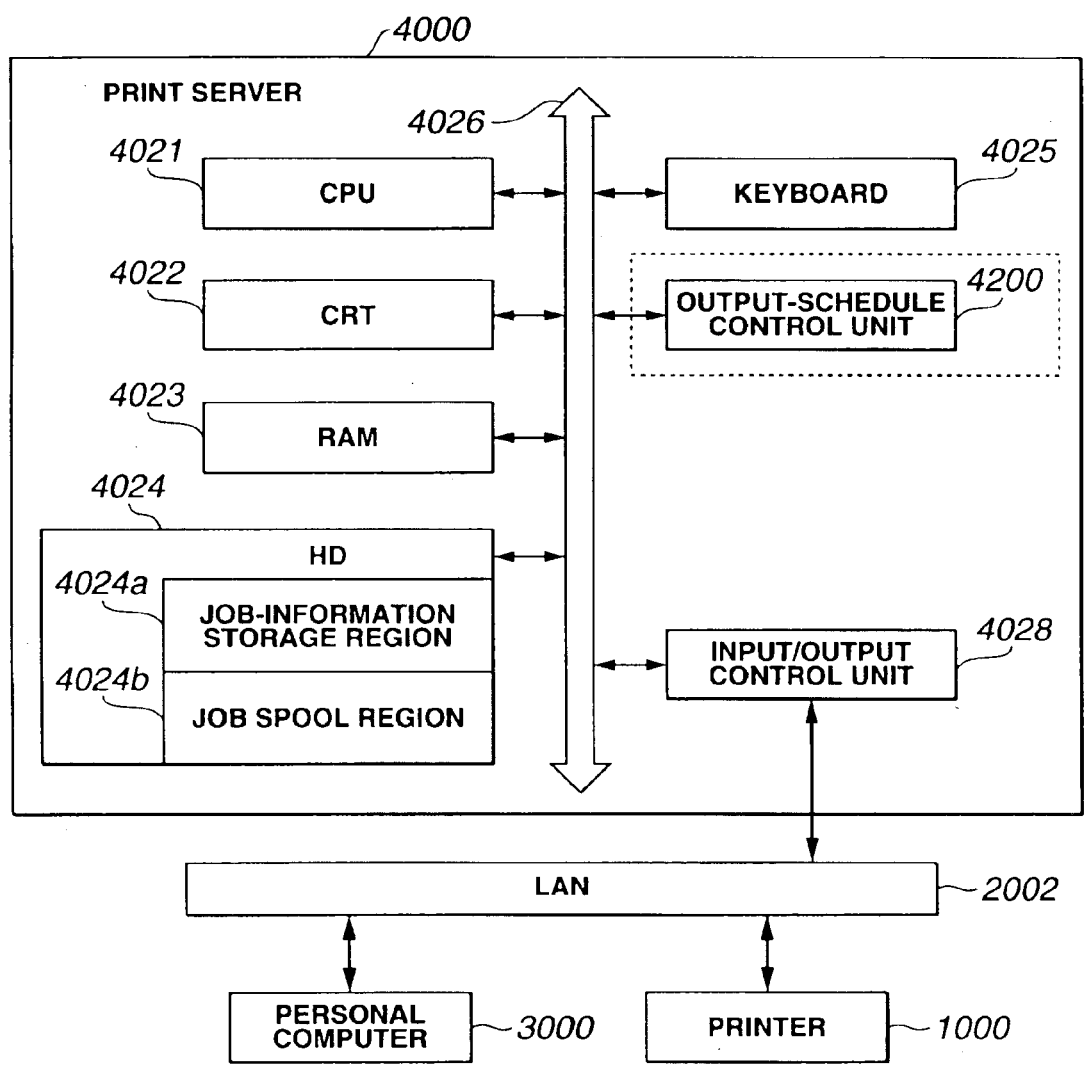
FIG. 16 is a block diagram illustrating the configuration of a print server.

FIG. 16 is a block diagram illustrating the configuration of the print server 4000. A CPU 4021 reads and executes a control program stored on a hard disk (HD) 4024 after loading the control program in a RAM 4023, and inclusively controls access to each device connected to a system bus 4026. The CPU 4021 also executes various programs stored in a program region of the hard disk 4024.

Various control programs are stored in the program region of the hard disk (HD) 4024. An output-schedule control unit 4200 is realized by execution of these control programs by the CPU 4021.

For example, a keyboard input program controls a keyboard 4025 so that a user can input an operation for instructing generation of image data or printing processing from the keyboard 4025. A CRT display program displays image data on a CRT 4022 based on the input operation.

An output-schedule program (an output-schedule control unit 4200) controls the order of transmission of printing jobs stored in a job spool region when transmitting the printing job to the printer 1000. The output-schedule control unit 4200 also changes the order of transmission of a printing job or cancels transmission of a printing job by receiving a command to instruct a change from the personal computer 3000. A transfer control program instructs an input/output control unit 4028 to transfer a printing job to the printer 1000. The output-schedule control unit 4200 is realized by execution of an output schedule program provided by the CPU 4021.

Figure 17:
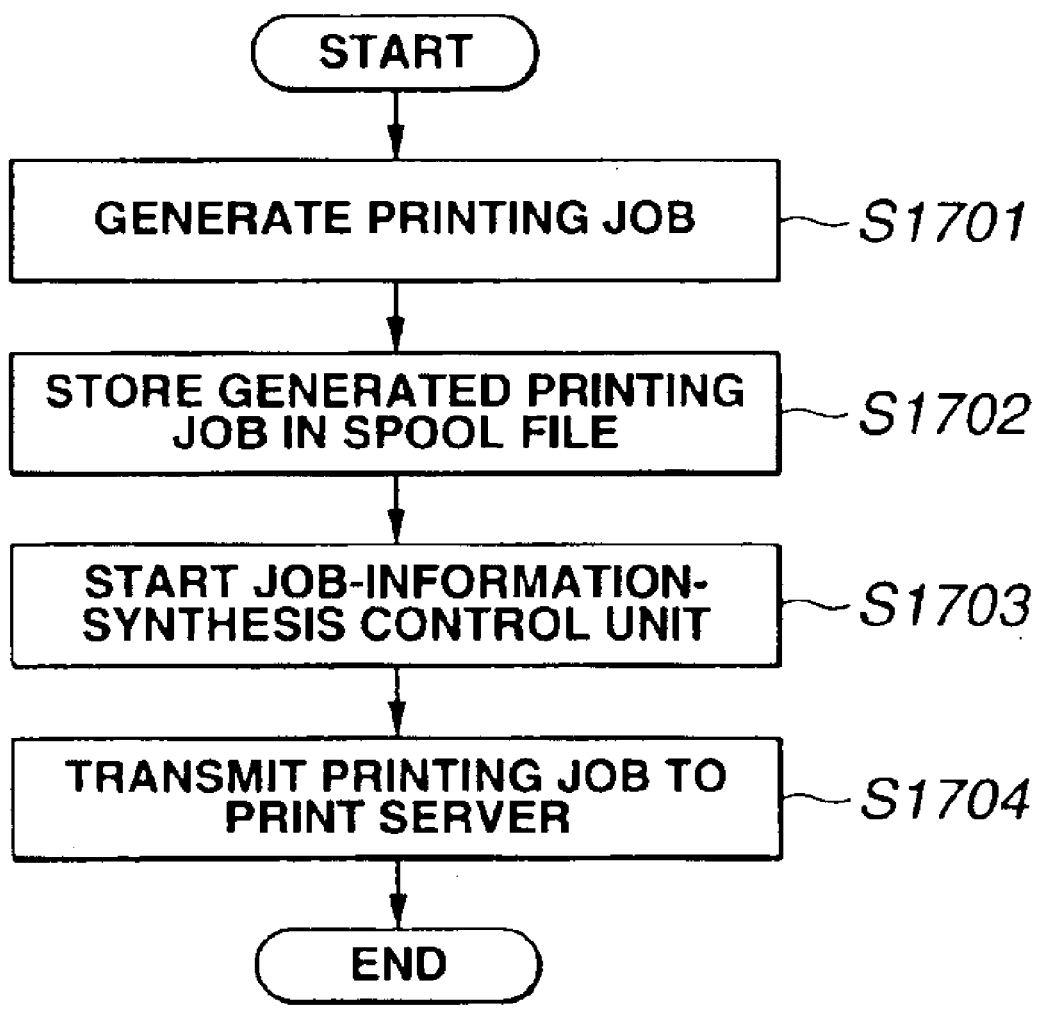
FIG. 17 is a flowchart illustrating printing-job transfer processing executed by the personal computer.

FIG. 17 is a flowchart illustrating printing-job transfer processing executed by the personal computer 3000. The processing program for this processing is stored on the hard disk 3024 of the personal computer 3000, and is executed by the CPU 3021.

First, when the user instructs execution of printing of an application file by operating the keyboard 4025, the printing-job generation unit 3201 is started by an application program, and generates printing-job data which can be processed by the printer (step S1701).

The generated printing-job data is stored into a job spool region 3024d within the hard disk 3024. At that time, information, such as the title of the generated printing job, the user name, the name of the output host apparatus, the name of the print server, the process status of the job within the job spool region (in storage, awaiting transfer, in transfer, or in deletion), and the like, is stored in a generated job management region within the same job spool region (step S1702). Such printing-job information is also transferred to the print server 4000 together with the printing job.

When the printing job has been stored in the spool file, the printing-job generation unit 3201 starts the job-information-synthesis control unit 3022. Thus, the job-information-synthesis control unit 3022 starts processing of storing the printing job in the job-information storage region 3024a (step S1703). The operation of the job-information-synthesis control unit 3202 will be described later.

When the printing job has been stored in the job spool region 3024d within the hard disk 3024, the input/output control unit 3028 transfers the printing job to the print server 4000 (step S1704).

Figure 18:
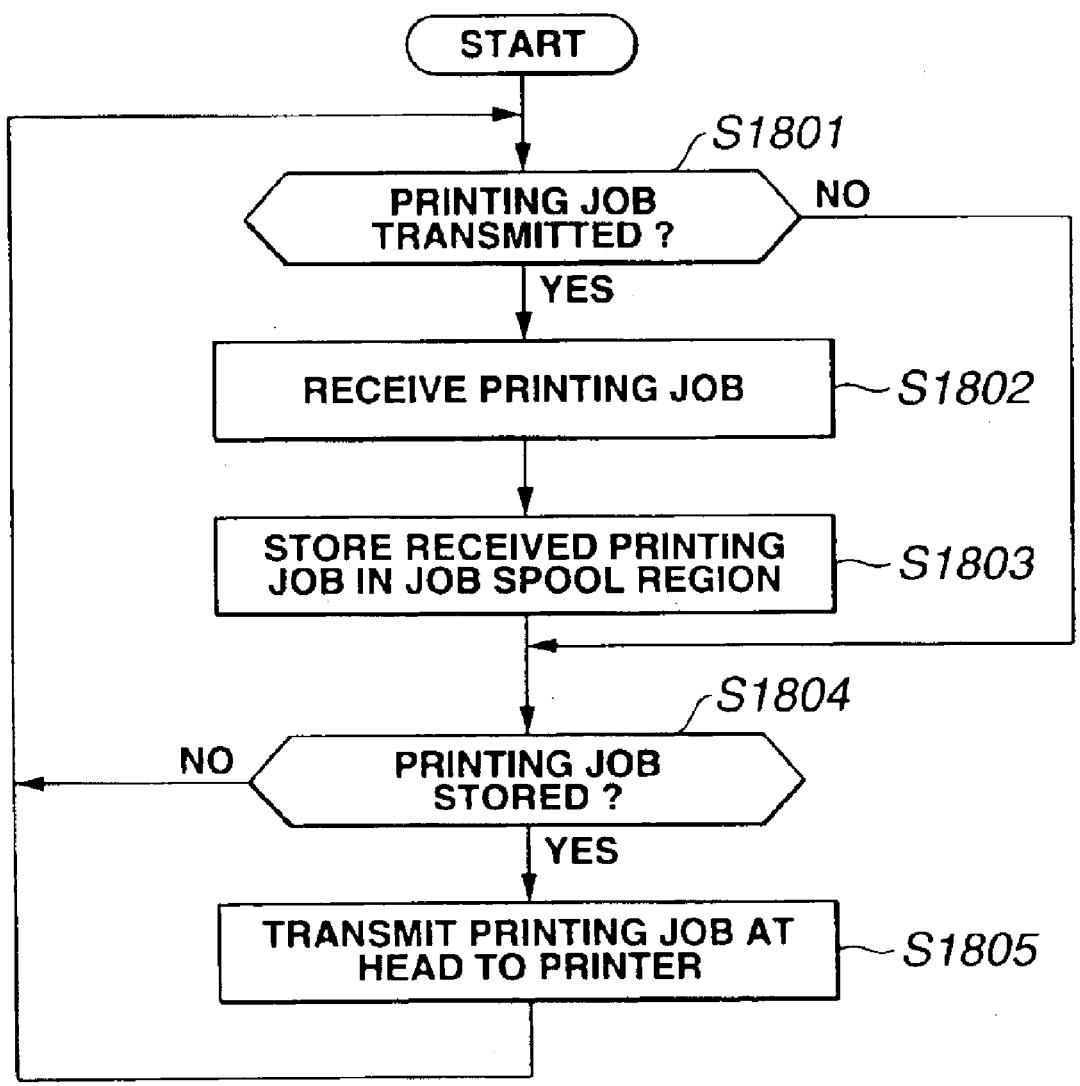
FIG. 18 is a flowchart illustrating printing-job transfer processing executed by the print server.

FIG. 18 is a flowchart illustrating printing-job transfer processing executed by the print server 4000. A processing program for this flowchart is stored on the hard disk 4024 of the print server 4000, and is executed by the CPU 4021.

First, it is determined whether or not a printing job has been transmitted from an external apparatus (step S1801). If the result of the determination in step S1801 is affirmative, the printing job is received (step S1802), and the received printing job is stored into the job spool region 4024b. At that time, the output-schedule control unit 4200 stores the title of the received printing job, the name of the user, the name of the output host apparatus, and the name of the user's own print server in the job-information storage region 4024a as job information. The process status of the concerned printing job is made to be "in storage". Since the order of transmission of the printing job is managed using a cue, the concerned printing job is connected to the tail of the cue.

Then, it is determined whether or not a printing job is stored in the job spool region 4024b (step S1804). When at least one printing job is stored in the job spool region 4024b, the output-schedule control unit 4200 controls the input/output control unit 4028 so as to transmit a printing job present at the head of the cue to the printer 1000. The input/output control unit 4028 thereby transfers the printing job to the printer 1000 (step S1805). The printer receives the printing job from the print server 4000, and executes the processing shown in FIG. 4.

Figure 19:
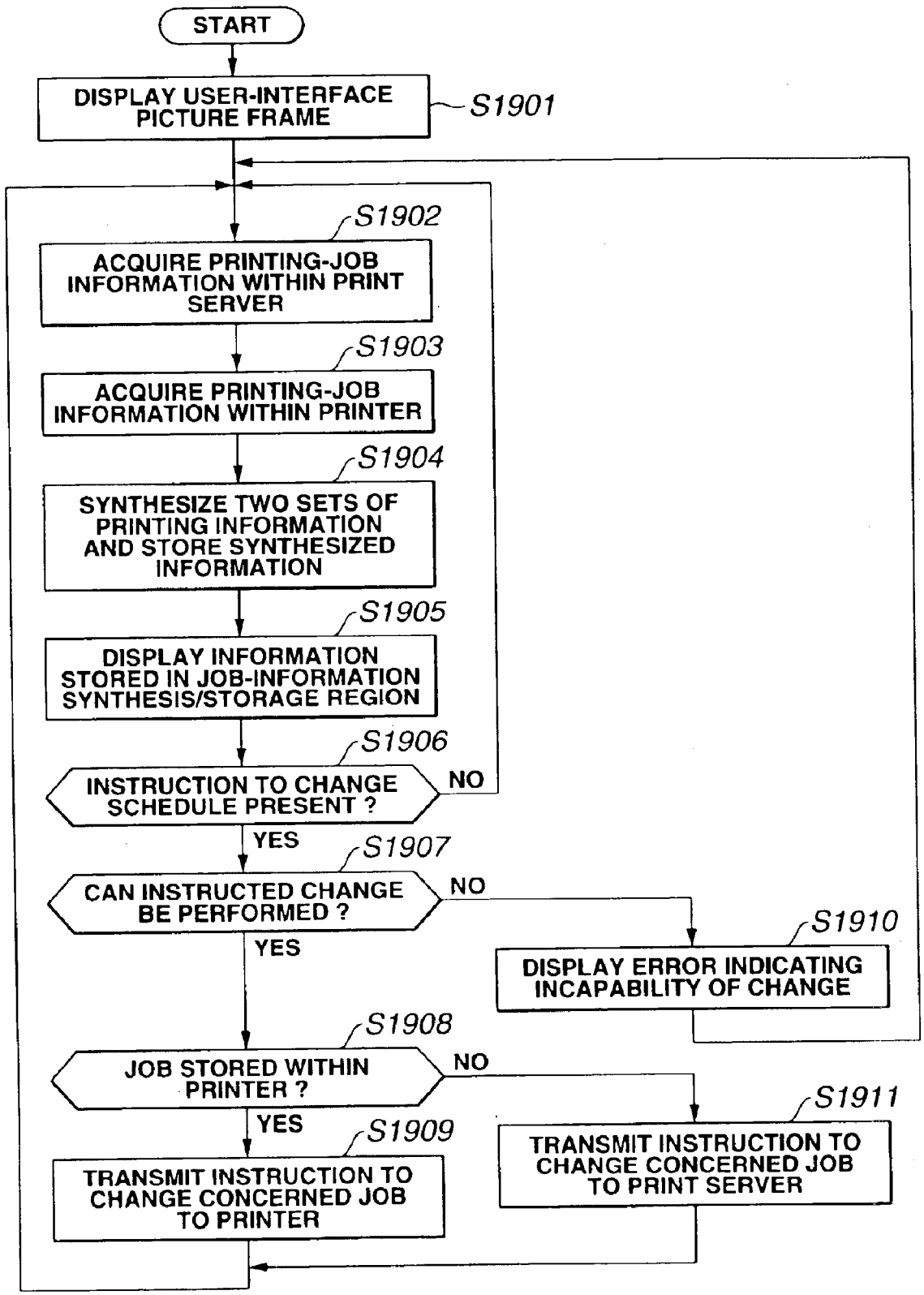
FIG. 19 is a flowchart illustrating a processing procedure in a job-information-synthesis control unit and a job-information-display control unit.

FIG. 19 is a flowchart illustrating a processing procedure in the job-information-synthesis control unit 3202 and the job-information-display control unit 3203. This processing is realized by the display control program for printing-job information. As described above, the display control program is stored on the hard disk (HD) 3024 within the personal computer 3000, and is executed after being loaded in the RAM 3023, by the CPU 3021.

First, the job-information-display control unit 3203 displays a user-interface picture frame on the CRT 3022 (step S1901). This user-interface picture frame is for displaying printing-job information and accepting an instruction to change the printing job from the user.

Then, the job-information-synthesis control unit 3202 acquires printing-job information stored in a job-information storage region 4024a of the print server 4000 via the input/output control unit 3028, and stores the acquired information in the job-information storage region 3024a within the hard disk 3024 (step S1902).

Then, the job-information-synthesis control unit 3202 acquires printing-job information stored in the job-information storage memory 16d of the printer control unit 1001 via the input/output control unit 3028, and stores the acquired information in the job-information-within-printer storage region 3024b within the hard disk 3024 (step S1903).

Then, by comparing/collating the printing-job information stored in the job-information storage region 3024a with printing-job information stored in the job-information-within-printer storage region 3024b, job information relating to all printing jobs to be subjected to output processing by the printer 1000 is stored in a job-information synthesis/storage region 4024c within the hard disk 4024 (step S1904). At that time, sets of job information relating to overlapped jobs are synthesized.

Job information after the synthesis is displayed on the user-interface picture frame displayed on the CRT 3022 (step S1905).

Then, it is determined whether or not the user has instructed a change in an output schedule (cancel of output, temporary interruption of output, or the like) of the printing job being displayed on the user-interface picture frame using the keyboard 3025 (step S1906). If the result of the determination in step S1906 is negative, the process returns to step S1902, and the display is continued while updating the status of processing of outputting the printing job by repeatedly executing the processing of steps S1902–S1905.

If the result of the determination in step S1906 is affirmative, it is then determined whether or not the printing job instructed to be changed can be changed (step S1907). If the result of the determination in step S1907 is negative, an error indicating incapability of change is displayed (step S1910).

If the result of the determination in step S1907 is affirmative, it is then determined whether or not the printing job instructed to be changed is a job already stored in the reception buffer storage 16a or the job storage memory 16b within the printer 1000 (step S1908). If the result of the determination in step S1908 is affirmative, a command to instruct a change of the concerned job is transmitted to the printer 1000 via the input/output control unit 3028 (step S1909).

If the result of the determination in step S1908 is negative, i.e., if the concerned printing job is stored in the job spool region 4024b of the print server 4000, a command to instruct a change of the printing job is transmitted to the print server 400 via the input/output control unit 3028 (step S1911).

FIGS. 20A, 20B and 20C are diagrams illustrating the job-information storage region 3024a, the job-information-within-printer storage region 3024b, and the job-information synthesis/storage region 3024c, respectively. The job-information storage region 3024a stores job information relating to printing jobs stored in the job spool region 4024b of the print server 4000, and is configured as shown in FIG. 20A.

The title of each printing job, the name of the user of the printing job, the name of the host apparatus which has output the printing job, the name of the print server storing the printing job, and the state of the printing job are stored in the job-information storage region 3024a. In FIG. 20A, printing-job information in which the job title is "job B", the user name is "user B", the name of the output host apparatus is "host apparatus B", the print-server name is "server A", and the process status is "in transfer" is stored. Similarly, printing-job information having "job C", "user A", "host apparatus A", "server A", and "awaiting transfer" is stored.

The job-information-within-printer storage region 3024b stores printing-job information stored in the job-information storage memory 16d within the RAM 16 of the printer 1000 and acquired via the input/output control unit 3028, and is configured as shown in FIG. 20B.

The printing-job-within-printer information is updated by notification by the IAN interface card 1013 to the personal computer 3000 utilizing the SNMP when processing information (completion of reception, completion of job analysis, completion of output, or the like) of the printer 1000 has changed, or by periodic poling by the input/output control unit 3028 from the printer 1000.

The title of each printing job, the name of the user of the printing job, the name of the host apparatus which has output the printing job, the name of the print server storing the printing job, and the state of the printing job are stored in the job-information-within-printer storage region 3024b. In FIG. 20B, printing-job information in which the job title is "job A", the user name is "user A", the name of the output host apparatus is "host apparatus A", the print-server name is "server A", and the process status is "in output" is stored. Similarly, printing-job information having "job Y", "user Y", "host apparatus Y", "server A", and "awaiting output", and printing-job information having "job B", "user B", "host apparatus B", "server A", and "in reception" are stored.

The job-information synthesis/storage region 3024c is obtained by synthesizing the job-information storage region 3024a and the job-information-within-printer storage region 3024b which have been described. The job-information synthesis/storage region 3024c stores printing-job information relating to all printing jobs being processed by the print server 4000 and the printer 1000, and is configured as shown in FIG. 20C.

The number of each printing job, the title of the printing job, the name of the user of the printing job, the name of the host apparatus which has output the printing job, the name of the print server storing the printing job, and the state of the printing job are stored in the job-information synthesis/storage region 3024c.

In FIG. 20C, printing-job information in which the job number is "1", the job title is "job A", the user name is "user A", the name of the output host apparatus is "host apparatus A", the print-server name is "server A", and the process status is "in output" is stored. Similarly, printing-job information having "2", "job Y", "user Y", "host apparatus Y", "server A", and "awaiting output", printing-job information having "3", "job B", "user B", "host apparatus B", "server A", and "in transfer", and printing-job information having "4", "job C", "user A", "host apparatus A", "server A", and "awaiting transfer" are stored.

Such job information is displayed on the CRT 3022 by the job-information-display control unit 3203, and is utilized by the user for instructing a change in the schedule of the printing job.

Figure 21:
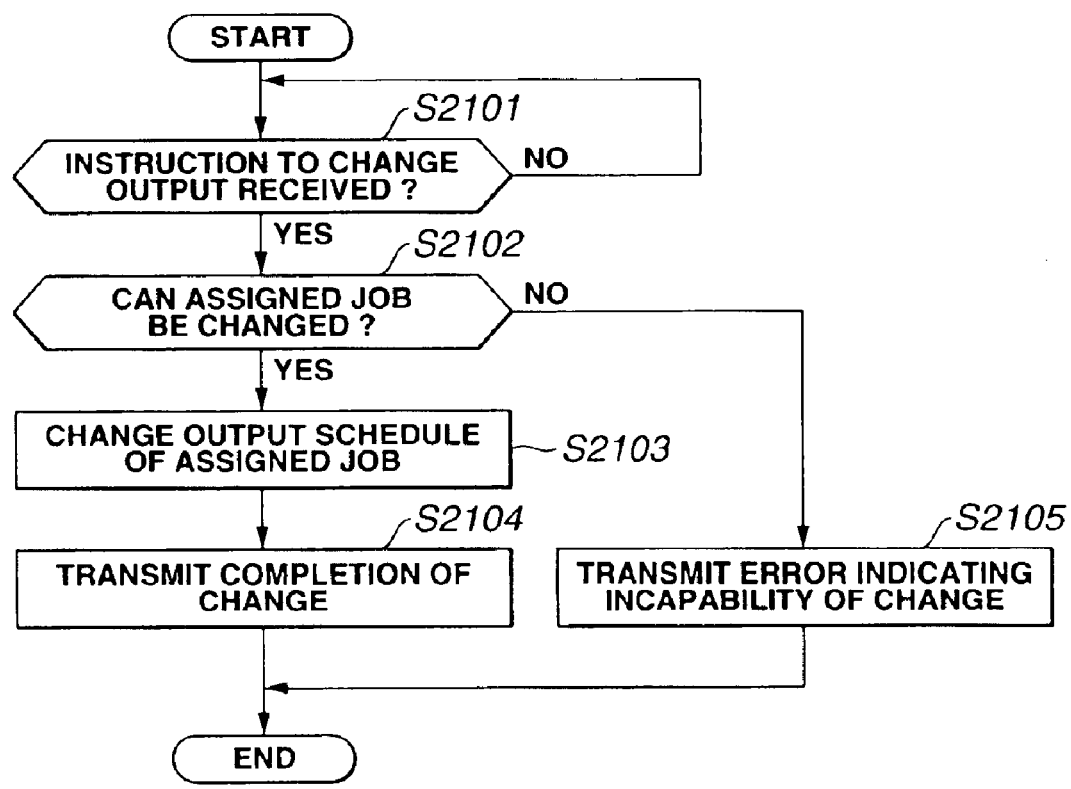
FIG. 21 is a flowchart illustrating an operation processing procedure executed when an output-schedule control unit of the print server receives an instruction to change output.

FIG. 21 is a flowchart illustrating an operation processing procedure to be executed when the output-schedule control unit 4200 of the print server 4000 has received an instruction to change output. A processing program for this flowchart is stored on the hard disk 4024 within the print server 4000, and is executed by the CPU 4021.

First, it is determined whether or not the output-schedule control unit 4200 has received an instruction to change output (a change-instruction packet) (step S2101). The change-instruction packet is transmitted from the job-information-display control unit 3203 in the processing of step S1911 shown in FIG. 19.

When an instruction to change output has been received, the output-schedule control unit 112 determines whether or not the schedule of the printing job assigned by control data of the change-instruction packet can be changed (step S2102). The assignment of the printing job by the control data is performed according to job information (the job title, the user name, the name of the host apparatus, and the print-server name).

The determination in step S2102 is performed by referring to job information (the job name, the user name, the name of the host apparatus, the print-server name, and the control level) stored in the job-information storage region 4024a.

When the concerned job is absent, when the concerned job has already been output, or when the control level of the concerned job cannot be changed, an error indicating incapability of change is transmitted to the personal computer which has provided the change-instruction packet (step S2106).

On the other hand, if the result of the determination in step S2102 is affirmative, the output-schedule control unit 112 performs a change of the schedule of the printing job (cancel, temporary interruption, exchange of the order, or the like) (step S2103).

When the type of the instruction of a change is "cancel", the assigning printing job is cancelled. That is, printing data of the concerned printing job stored in the job spool region 4024b is deleted (or made ineffective), and job information relating to the concerned printing job stored in the job-information storage region 4024a is deleted.

When the type of the instruction of a change is "temporary interruption", the assigned printing job is removed from the cue. However, printing data and job information relating to the concerned printing job are not deleted, and arrival of an instruction of resumption is awaited. When the type of an instruction of a change is "resumption", the assigned printing job is again connected to the cue.

When the type of the instruction of a change is "interruption", an interrupt command is added to the assigned printing job, and the printing job is instantaneously transferred to the printer 1000. Upon reception of the printing job to which the interrupt command is added, the printer 1000 interrupts a printing job currently being processed, and the processes the received printing job. More specifically, the processing shown in FIG. 4 or 8 is instantaneously executed for the newly received printing job.

Then, completion of the schedule changing processing is transmitted to the personal computer that has instructed the change (step S2104).

When the personal computer 3000 has received the notification of the completion of the change from the print server 4000, the job-information-synthesis control unit 3202 updates job information within the job-information synthesis/storage region 3024c, and the job-information-display control unit 3203 displays the notification of the completion of the change on the CRT 3022. Thus, the user is notified of the completion of the schedule changing processing.

When the printer 1000 has received an instruction to change output (a change instructing packet) from the personal computer 3000, the processing shown in FIG. 9 is executed.

Figure 22:
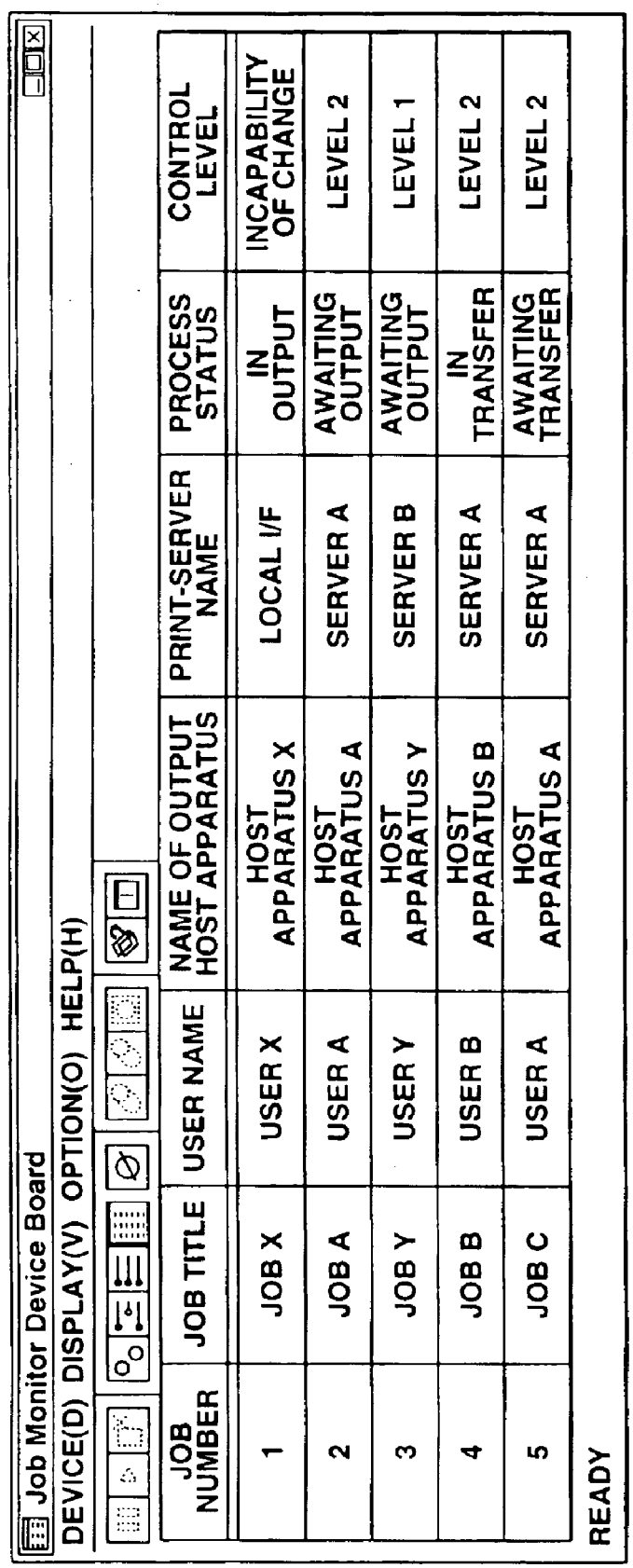
FIG. 22 is a diagram illustrating a user interface picture frame displayed in step S505 shown in FIG. 5 or step S1905 shown in FIG. 19.

FIG. 22 is a diagram illustrating the user-interface picture frame displayed in step S505 shown in FIG. 5 or step S1905 shown in FIG. 19. In this picture frame, the printing-job information stored in the job-information synthesis/storage region is displayed for each printing job.

The user moves a cursor using a pointing device. When a printing job has been selected by the cursor, the line of the selected printing job is subjected to reversal display. When "interrupt", "cancel", "temporary interruption" or the like has been selected from the menu in this state, a command to instruct a change is provided.

As described above, by allowing management of all printing jobs to be processed within a printing system including a printer, a personal computer and a print server, the user can know the actual state of load of processing of a printing job to be output from the printer 1000. As a result, for example, it is possible to search for an idle printer, or assuredly transfer a job to a printer having small load, resulting in effective utilization of printing-job information.

Although a description has been provided of the preferred embodiments of the present invention, the present invention is not limited to the above-described embodiments. The present invention may be applied to any other configuration which can achieve the functions indicated by the appended claims or the functions of the above-described embodiments.

For example, the printer is not limited to a laser-beam printer, but may be an ink-jet printer, a thermal-transfer-type printer, a wire-dot printer or the like. Furthermore, a copier, a facsimile apparatus, or a composite apparatus having the functions of these apparatuses may be used instead of the printer.

The present invention may be applied to a single apparatus, or a system including a plurality of apparatuses, provided that the functions of the invention can be executed. For example, the present invention may be applied to a system in which processing is performed via a network, such as a LAN/WAN or the like.

The preferred embodiments of the present invention have been described in detail. The present invention may be applied to a system including a plurality of apparatuses, or to an apparatus including a single unit.

The present invention may also be applied to a case in which the objects of the invention are achieved by supplying a system or an apparatus with a program of software for realizing the functions of the above-described embodiments directly or from a remote location, and reading and executing the supplied program by a computer of the system or the apparatus. In this case, any means other than a program may also be used, provided that the means has the functions of a program. FIG. 23 is a diagram illustrating a method for supplying an apparatus with a program, using a recording medium.

Accordingly, program codes themselves installed in the computer in order to realize the processing of the functions of the present invention by the computer also constitute the present invention. That is, the claims of the present invention include a computer program itself for realizing the processing of the functions of the present invention.

In such a case, the program may have any form, such as object codes, a program executed by an interpreter, script data supplied to an OS (operating system), or the like, provided that the functions of the program are possessed.

A floppy disk, a hard disk, an optical disk, a magnetooptical disk, a CD(compact disc)-ROM, a CD-R (recordable), a CD-RW (rewritable), a magnetic tape, a nonvolatile memory card, a ROM, a DVD (digital versatile disk) (DVD-ROM or DVD-R), or the like may be used as a recording medium for supplying the program.

In a method for supplying a program, a recording medium, such as a hard disk or the like, is connected to an Internet home page using a browser of a client computer, and a computer program itself of the present invention or a compressed file having an automatic installing function is downloaded from the home page onto the recording medium. In another approach, program codes constituting a program of the present invention are divided into a plurality of files, and the respective files are downloaded from different home pages. That is, a WWW server for downloading a program file for realizing the processing of the functions of the present invention in a computer for a plurality of users is also included within the claims of the present invention.

In still another approach, a program of the present invention is stored in a storage medium, such as a CD-ROM or the like, by being encrypted and is distributed to users. A user who has cleared predetermined conditions is allowed to download key information for solving encryption from an Internet home page. The encrypted program is executed by using the key information by being installed in a computer.

The present invention may be applied not only to a case in which the functions of the above-described embodiments are realized by executing program codes read by a computer, but also to a case in which an OS or the like operating in a computer executes a part or the entirety of actual processing, and the functions of the above-described embodiments are realized by the processing.

The present invention may also be applied to a case in which, after writing a program read from a storage medium into a memory provided in a function expanding board inserted into a computer or in a function expanding unit connected to the computer, a CPU or the like provided in the function expanding board or the function expanding unit performs a part or the entirety of actual processing, and the functions of the above-described embodiments are realized by the processing.

According to the present invention, it is possible to display printing-job information relating to printing jobs present within a print server and printing-job information relating to printing jobs present within a printer at a time, so that the user can exactly know all printing jobs to be processed by the printer.

Furthermore, even if the user does not know whether a printing job is present in a print server or in a printer, a change in a schedule of a printing job assigned by the user can be appropriately performed in the print server or in the printer.

As for a printing job already transferred from a print spooler to an image output apparatus, it is possible to acquire information relating to the state of processing of the printing job, and integrally display and notify the states of respective processes starting from the user's execution of a printing operation until the printing job is actually output from the image output apparatus, for the user, resulting in improvement in the user interface.

It is also possible to control or instruct control of a printing job already transferred from a print spooler to an image output apparatus, resulting in improvement in the operability by the user.

Furthermore, in respective processing steps starting from generation of a printing job in accordance with the user's printing operation until the printing job is actually output from an image output apparatus, the user can integrally control and instruct temporary interruption of processing of the printing job, cancel of the printing job, exchange of the order of processing, interrupt of a printing job, and the schedule of the printing job.

By displaying and notifying, for example, whether or not a printing job transferred from another print spooler or another input unit, more specifically, a printing job from another user which has been input in advance, is present within an image output apparatus, the user can assuredly confirm the order of output of the user's own printing job.

When a printing job input from a print server and a printing job transferred from another print server or another input unit are mixed within an image output apparatus, processing of a change which can be instructed by the user can be limited based on attribute information of each printing job, more specifically, the level of instruction control and execution or the level of permission of control set for each input/output unit and each user.

The individual components shown in outline or designated by blocks in the drawings are all well known in the information processing apparatus and information display method arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus comprising:
   first storage means for storing job information relating to output jobs within an output apparatus in a first storage area;
   second storage means for storing job information relating to output jobs within an output control apparatus for transferring an output job to the output apparatus in a second storage area; and
   display control means for displaying a list of the job information relating to the output jobs within the output apparatus and the job information relating to the output jobs within the output control apparatus on a display unit, based on the job information stored in the first storage area and the job information stored in the second storage area.

2. An information processing apparatus according to claim 1, wherein said display control means displays an order of output of output jobs to be output by the output apparatus, based on the job information stored in the first storage area and the job information stored in the second storage area.

3. An information processing apparatus according to claim 1, further comprising instruction input means for accepting an instruction to change an output schedule of an output job selected on the display unit.

4. An information processing apparatus according to claim 3, further comprising command transmission means for determining whether the output job assigned by the instruction of change is in the output apparatus or in the output control apparatus, and for transmitting a change command to the output apparatus based on a result of the determination.

5. An information processing apparatus according to claim 3, further comprising command transmission means for determining whether the output job assigned by the instruction of change is in the output apparatus or in the output control apparatus, and for transmitting a change command to the output control apparatus based on a result of the determination.

6. An information processing apparatus according to claim 1, wherein the output apparatus and the output control apparatus are interconnected via a network.

7. An information display method comprising:
   a first storage step, of storing job information relating to output jobs within an output apparatus in a first storage area;
   a second storage step, of storing job information relating to output jobs within an output control apparatus for transferring an output job to the output apparatus in a second storage area; and
   a display control step, of displaying a list of the job information relating to the output jobs within the output apparatus and the job information relating to the output jobs within the output control apparatus on a display unit, based on the job information stored in the first storage area and the job information stored in the second storage area.

8. An information display method according to claim 7, further comprising a third storage step, of synthesizing the job information stored in the first storage area and the job information stored in the second storage area, and storing resultant information in a third storage area.

9. An information display method according to claim 7, wherein in said display control step, an order of output of output jobs to be output by the output apparatus is displayed based on the job information stored in the first storage area and the job information stored in the second storage area.

10. An information display method according to claim 7, further comprising an instruction input step, of accepting an instruction to change an output schedule of an output job selected on the display unit.

11. An information display method according to claim 10, further comprising a command transmission step, of determining whether the output job assigned by the instruction of change is in the output apparatus or in the output control apparatus, and transmitting a change command to the output apparatus based on a result of the determination.

12. An information display method according to claim 10, further comprising a command transmission step, of determining whether the output job assigned by the instruction of change is in the output apparatus or in the output control apparatus, and transmitting a change command to the output control apparatus based on a result of the determination.

13. An information display method according to claim 10, wherein the instruction of change includes an instruction to cancel the output job.

14. An information display method according to claim 10, further comprising a change step, of determining whether or not the output schedule of the selected output job can be changed, based on a control level set for the output job assigned by the instruction of change, and changing the output schedule of the output job based on a result of the determination.

15. An information display method according to claim 7, wherein the output apparatus is a printer, and the output control apparatus is a print server.

16. An information display method according to claim 7, wherein the output apparatus and the output control apparatus are interconnected via a network.

17. An information display program for causing a computer to execute steps comprising:
   a first storage step, of storing job information relating to output jobs within an output apparatus in a first storage area;

a second storage step, of storing job information relating to output jobs within an output control apparatus for transferring an output job to the output apparatus in a second storage area; and a display control step, of displaying a list of the job information relating to the output jobs within the output apparatus and the job information relating to the output jobs within the output control apparatus on a display unit, based on the job information stored in the first storage area and the job information stored in the second storage area.

18. An information display program according to claim 17, wherein in said display control step, an order of output of output jobs to be output by the output apparatus is displayed based on the job information stored in the first storage area and the job information stored in the second storage area.

19. An information display program according to claim 17, wherein said program causes the computer to execute an instruction input step, of accepting an instruction to change an output schedule of an output job selected on the display unit.

20. An information display program according to claim 19, wherein said program causes the computer to execute a command transmission step, of determining whether the output job assigned by the instruction of change is in the output apparatus or in the output control apparatus, and transmitting a change command to the output apparatus based on a result of the determination.

21. An information display program according to claim 19, wherein said program causes the computer to execute a command transmission step, of determining whether the output job assigned by the instruction of change is in the output apparatus or in the output control apparatus, and transmitting a change command to the output control apparatus based on a result of the determination.

22. An information display program according to claim 17, wherein the output apparatus and the output control apparatus are interconnected via a network.

23. A network system in which an output apparatus and an output control apparatus are interconnected via a network, said network system comprising:

first storage means for storing job information relating to output jobs within an output apparatus in a first storage area;

second storage means for storing job information relating to output jobs within an output control apparatus for transferring an output job to the output apparatus in a second storage area;

display control means for displaying a list of the job information relating to the output jobs within the output apparatus and the job information relating to the output jobs within the output control apparatus on a display unit, based on the job information stored in the first storage area and the job information stored in the second storage area;

instruction input means for accepting an instruction to change an output schedule of an output job selected on the display unit;

command transmission means for determining whether the output job assigned by the instruction is within the output apparatus or within the output control apparatus, and transmitting a change command to the output apparatus or the output control apparatus based on a result of the determination;

first change means for changing an output schedule of the output job within the output apparatus in accordance with the change command transmitted from said command transmission means; and second change means for changing an output schedule of the output job within the output control apparatus in accordance with the change command transmitted from said command transmission means.

24. A network system according to claim 23, wherein the output apparatus is a printer, and the output control apparatus is a print server.

25. An information processing apparatus comprising:

acquisition means for acquiring job information relating to output jobs within an output apparatus from the output apparatus; and display control means for displaying job information relating to both of the output jobs within the output apparatus and output jobs within an output control apparatus for transferring an output job to the output apparatus, based on the acquired job information and job information relating to the output jobs within the output control apparatus.

26. An information processing apparatus according to claim 25, further comprising:

second acquisition means for acquiring the job information relating to the output jobs within the output control apparatus from the output control apparatus, wherein said display control means displays the job information, based on the job information acquired by said acquisition means and said second acquisition means.

27. An information display method comprising:

an acquisition step, of acquiring job information relating to output jobs within an output apparatus from the output apparatus; and a display control step, of displaying, on a display unit, job information relating to both of the output jobs within the output apparatus and output jobs within an output control apparatus for transferring an output job to the output apparatus, based on the acquired job information and job information relating to the output jobs within the output control apparatus.

28. An information display method according to claim 27, wherein in said display control step, an order of output of output jobs to be output by the output apparatus is displayed based on the acquired job information and the job information relating to the output jobs within the output control apparatus.

29. An information display method according to claim 27, further comprising a command transmission step, of determining whether the output job assigned by an instruction to change an output schedule of an output job selected on the display unit is in the output apparatus or in the output control apparatus, and transmitting a change command to the output apparatus based on a result of the determination.

30. An information display method according to claim 27, further comprising a command transmission step, of determining whether the output job assigned by an instruction to change an output schedule of an output job selected on the display unit is in the output apparatus or in the output control apparatus, and transmitting a change command to the output control apparatus based on a result of the determination.

* * * * *